United States Patent
Breitzman

(10) Patent No.: US 7,433,884 B2
(45) Date of Patent: Oct. 7, 2008

(54) IDENTIFICATION OF LICENSING TARGETS USING CITATION NEIGHBOR SEARCH PROCESS

(75) Inventor: Anthony F. Breitzman, 5 Nottingham Dr., Sicklerville, NJ (US) 08081

(73) Assignees: Chi Research, Inc., Haddon Heights, PA (US); Anthony F. Breitzman, Sicklerville, NJ (US)

( * ) Notice: Subject to any disclaimer, the term of this patent is extended or adjusted under 35 U.S.C. 154(b) by 426 days.

(21) Appl. No.: 10/953,044

(22) Filed: Sep. 29, 2004

(65) Prior Publication Data

US 2006/0074867 A1  Apr. 6, 2006

(51) Int. Cl.
G06F 17/00 (2006.01)
G06F 7/00 (2006.01)

(52) U.S. Cl. ............... 707/102; 707/104.1; 705/35; 705/36 R; 705/37

(58) Field of Classification Search ............. None
See application file for complete search history.

(56) References Cited

U.S. PATENT DOCUMENTS

| | | | | |
|---|---|---|---|---|
| 5,623,679 A * | 4/1997 | Rivette et al. | ............... | 715/526 |
| 5,623,681 A * | 4/1997 | Rivette et al. | ............... | 715/522 |
| 5,799,325 A * | 8/1998 | Rivette et al. | ............... | 715/500 |
| 5,809,318 A * | 9/1998 | Rivette et al. | ............... | 715/512 |
| 5,845,301 A * | 12/1998 | Rivette et al. | ............... | 715/512 |
| 5,950,214 A * | 9/1999 | Rivette et al. | ............... | 715/512 |
| 5,991,751 A * | 11/1999 | Rivette et al. | ............... | 707/1 |
| 5,991,780 A * | 11/1999 | Rivette et al. | ............... | 715/512 |
| 6,018,749 A * | 1/2000 | Rivette et al. | ............... | 715/525 |
| 6,038,574 A * | 3/2000 | Pitkow et al. | ............... | 715/513 |
| 6,175,824 B1 * | 1/2001 | Breitzman et al. | ........ | 705/36 R |
| 6,457,028 B1 * | 9/2002 | Pitkow et al. | ............... | 715/513 |
| 6,499,026 B1 * | 12/2002 | Rivette et al. | ............... | 707/2 |
| 6,556,992 B1 | 4/2003 | Barney et al. | ............... | 707/6 |
| 6,604,114 B1 * | 8/2003 | Toong et al. | ............... | 707/104.1 |
| 6,832,211 B1 * | 12/2004 | Thomas et al. | ............... | 705/35 |
| 6,879,990 B1 * | 4/2005 | Boyer et al. | ............... | 707/102 |
| 2002/0004775 A1 | 1/2002 | Kossovsky et al. | ............ | 705/37 |

(Continued)

FOREIGN PATENT DOCUMENTS

WO  WO 01/35277 A1 *  5/2001

(Continued)

OTHER PUBLICATIONS

Narin, F., E. Noma and R. Perry "Patents as Indicators of Corporate Technological Strength", Research Policy, vol. 16, 1987, pp. 143-155.*

(Continued)

*Primary Examiner*—Luke S. Wassum
(74) *Attorney, Agent, or Firm*—Panitch Schwarze Belisario & Nadel LLP

(57) ABSTRACT

A portable database can be used by a client organization with substantial numbers of patents to identify target organizations that may be interested in licensing said patents. The database combines the power of citation analysis for identifying licensing targets with the power of citation neighbor searching for identifying similar patents and for overcoming some of the weaknesses inherent with citation analysis. A company can identify targets outside of its core industry that may be interested in licensing the technology in its patents.

38 Claims, 16 Drawing Sheets

Visual Schematic of Neighbor Connections between a Source and Neighbor Patent

U.S. PATENT DOCUMENTS

| | | | | |
|---|---|---|---|---|
| 2002/0152146 | A1* | 10/2002 | Reader | 705/35 |
| 2002/0174131 | A1* | 11/2002 | Winer et al. | 707/102 |
| 2002/0178029 | A1* | 11/2002 | Nutter et al. | 705/1 |
| 2003/0046307 | A1* | 3/2003 | Rivette et al. | 707/104.1 |
| 2003/0195764 | A1 | 10/2003 | Baker et al. | 705/1 |
| 2004/0015481 | A1 | 1/2004 | Zinda | 707/1 |
| 2004/0083117 | A1* | 4/2004 | Kim et al. | 705/1 |
| 2004/0103112 | A1 | 5/2004 | Colson et al. | 707/102 |
| 2004/0122841 | A1* | 6/2004 | Goodman et al. | 707/102 |
| 2004/0133433 | A1* | 7/2004 | Lee et al. | 705/1 |
| 2004/0133562 | A1* | 7/2004 | Toong et al. | 707/3 |
| 2005/0097093 | A1* | 5/2005 | Clarkson | 707/3 |

FOREIGN PATENT DOCUMENTS

| | | |
|---|---|---|
| WO | WO 01/84423 A2 * | 11/2001 |
| WO | WO 01/84424 A2 * | 11/2001 |
| WO | WO 01/84425 A2 * | 11/2001 |
| WO | WO 01/84426 A2 * | 11/2001 |

OTHER PUBLICATIONS

Griliches, Z. "Patent Statistics as Economic Indicators: A Survey", Journal of Economic Literature, vol. 28. Dec. 1990, pp. 1661-1707.*

Dialog "Dialog Patent Seminar", 1995, Section 8: Miscellaneous Search Techniques, pp. 8-1 through 8-6.*

National Science Foundation "Finding Value in Patent Portfolios Using Co-Citation Analysis", NSF Award Abstract # 9661754, Jun. 23, 1997.*

Mogee, M.E. "Patent Analysis Methods in Support of Licensing", Technology Transfer Society Annual Conference, Jul. 22, 1997.*

Hall, B.H., A. Jaffe and M. Trajtenberg "Market Value and Patent Citations: A First Look", Conference on Intangibles and Capital Markets, May 15-16, 1998.*

Narin, F. "Tech-Line® Background Paper", CHI Research, Inc., Aug. 19, 1998.*

Aurigin "How to Gain an Advantage in IP Licensing", Slide Presentation, Mar. 4, 1999.*

Lambert, N. "A Comparison of Two Top Internet Patent Sites, And Why I Still Search Patents Online", Searcher, vol. 7, No. 3, Mar. 1999, p. 48.*

Information Today "CHI Research, Inc. Introduces Tech-Line Analysis Tool Technology", press release, 1999.*

Metrics Group "Welcome to PatentCitations.com", downloaded from www.patentcitations.com, Dec. 3, 2001.*

Metrics Group "Citation Indication Analytics Database", downloaded from www.metricsgroup.com, Jun. 5, 2002.*

Breitzman, A.F. and M.E. Mogee "The Many Applications of Patent Analysis", Journal of Information Science, vol. 28, No. 3, 2002, pp. 187-205.*

Mogee Research & Analysis, LLC "MRAA—Basic Package: Patent Citation Reports", downloaded from mogee.com, Jun. 7, 2003.*

Hamid, Z.A.A. "Pre-Licensing Consideration Through Patent Mapping", LES Singapore, Oct. 6, 2003.*

MetricsGroup "In-House Tools & Methodology", downloaded from www.metricsgroup.com, Oct. 12, 2003.*

Metrics Group "Patent Licensing", downloaded from www.metricsgroup.com, Dec. 3, 2003.*

Metrics Group "Citation Bridge", downloaded from www.patentcitations.com, Feb. 1, 2004.*

MetricsGroup "Patent Citation Analytics", downloaded from www.metricsgroup.com, Feb. 20, 2004.*

Anthony J. Trippe, "Patinformatics: Identifying Haystacks from Space," Searcher, vol. 10, No. 9, Oct. 2002, printout from web site: http://www.infotoday.com/searcher/oct02/trippe.htm, printout date: Oct. 18, 2004, 15 pages.

"Metrics Group: Patent Licensing", Copyright © 2004, EKMS, Inc., printout from web page: http://www.metricsgroup.com/hcwhy_pl.cfm, printout date: Oct. 18, 2004, 1 page.

Metrics Group News Release dated Apr. 18, 2002, "Metrics Announces the formation of a Research Services Practice Specializing in Patent Mining," printout from web page: http://www.metricsgroup.com/press_news_41802.cfm, printout date: Oct. 18, 2004, 2 pages.

Brochure for "Patent Portfolio Management," TAEUS, Colorado Springs, Colorado, brochure date is unknown, 2 pages.

Ina Fried, "Microsoft opens technology to more licensing," CNET News.com, Dec. 3, 2003, 5 pages.

Dawn Kawamoto et al. "HP seeks profits from its patents," CNET News.com, Feb. 24, 2003, 4 pages.

Newsletter article: "Patent Citation Analysis is a Tool for Technology Transfer," CHI's Research, May 1995, 2 pages.

Anthony F. Breitzman et al. "The many applications of patent analysis," Journal of Information Science, vol. 28, No. 3, 2002, pp. 187-205.

* cited by examiner

Screen Shot of Neighboring Software Cover Sheet

```
BRIEF EXPLANATION OF CHI RESEARCH PATENT CITATION NEIGHBOR SEARCHES
----- ----------- -- --- -------- ------ -------- -------- --------

CHI's  Patent Citation Neighbor Search finds  patents  linked  to
a given source patent by references (citations).   For example, if the
front  page  of patent  A,  under the  heading "references cited" lists
patent B as a reference, then we say patent A cites patent B.  This est-
ablishes  a  link of strength 1.0 between patents A and B.  If patent B,
in turn, cites patent C,  this establishes  a link of strength 1/2 bet-
ween patents A and C.  Similarly, if A cites B, B cites C and C cites D,
then the strength of the link between A and D is 1/3.

Example :

A ---references--> B ---references--> C ---references--> D

Patent A is linked to patent B with strength 1 .
     Patent A is linked to patent C with strength 1/2.
     Patent A is linked to patent D with strength 1/3.

CHI's  standard  Patent  Citation  Neighbor  Search finds all patents
linked  to the given source patent by links of  strength 1/3 or more.  Any
pair of patents  may be  linked  through many  different referencing paths.
The Neighbor Search lists the  linked patents in order, most strongly linked
listed  first,  where strength  is defined as   the sum of strengths for each
unique  path connecting  the pair.   The most  strongly linked patent to the
given source patent is, in this sense, the "nearest neighbor" patent.

Example :

Path 1 :  A ---references--> B ---references--> D
     Path 2 :  A ---references--> B ---references--> C ---references--> D In Path 1, patent A is linked to patent D with strength 1/2.
     In Path 2, patent A is linked to patent D with strength 1/3.

The total strength of the links between patents A and D is 0.83.
```

*Figure 2*

Screen Shot of Built-in Report Showing Neighbors for Two Source Patents

Source and Neighbors from Search:   Forward Search: fastener

| | Patent | App. Date | Pub Date | Title | Assignee Parent(s) | Strength | Advantage |
|---|---|---|---|---|---|---|---|
| Source Patent: | 04801062 | 6/18/1987 | 1/31/1989 | SIDE LOAD MAGAZINE FOR A FASTENER DRIVING TOOL | Illinois Tool Works Inc | | |
| Neighbor Patents | | | | | | | |
| | 05842625 | 10/16/199 | 12/1/1998 | Nail guide device of a box nailing machine | Max Co. Ltd. | 3 | 2 |
| | 06609646 | 2/7/2002 | 8/26/2003 | Magazine assembly for fastening tool | Black & Decker Corp, The | 2.5 | 2 |
| | 06641019 | 7/16/2001 | 11/4/2003 | Fastener driving tool with multi-size fastener magazine | ** UNASSIGNED ** | 2 | 3 |
| | 05368213 | 4/29/1993 | 11/29/199 | Magazine for a pneumatic fastener driving tool | SENCO PRODUCTS, INC. | 2 | 0 |
| | 04624401 | 7/16/1985 | 11/25/198 | DEVICE FOR DRIVING FASTENING ELEMENTS | Hilti AG | 2 | -1 |
| | E0938953 | 2/24/1999 | 9/1/1999 | Magazine for compressed-air nail firing tool | TEMAR SRL | 1.5 | 1 |
| | 06516989 | 11/12/199 | 2/11/2003 | Magazine assembly for stapling guns | REGITAR POWER TOOLS CO., LTD. | 1.5 | 1 |
| | 05720422 | 3/18/1996 | 2/24/1998 | Staple tacker with a striking nose and a staple magazine | Hitachi Koki Co Ltd | 1.5 | 1 |
| | 06076721 | 7/7/1999 | 6/20/2000 | Structure of a nailing machine | ** UNASSIGNED ** | 1 | 1 |
| | 05702046 | 6/1/1995 | 12/30/199 | Staple gun having a rotating lower housing | RO-KEY CORP. | 1 | 1 |
| | 05427298 | 10/28/199 | 6/27/1995 | Method and apparatus for indicating quantity of fasteners in a fastening device | ** UNASSIGNED ** | 1 | 1 |
| | 06085959 | 3/10/1999 | 7/11/2000 | Nailer magazine with blocking device | DE POAN PNEUMATIC CORP. | 1 | 1 |
| Source Patent: | 04802807 | 4/14/1988 | 2/7/1989 | THREADED FASTENER | Illinois Tool Works Inc | | |
| Neighbor Patents | | | | | | | |
| | 06599071 | 7/20/2000 | 7/29/2003 | Dual plated fasteners | MCGARD, INC. | 2.5 | 4 |
| | 05096352 | 3/7/1990 | 3/17/1992 | Diamond coated fasteners | ** UNASSIGNED ** | 2.5 | 1 |
| | 04554208 | 11/23/198 | 11/19/198 | METAL BEARING SURFACE HAVING AN ADHERENT SCORE-RESISTANT COATING | General Motors Corporation | 2.5 | 0 |
| | 04663183 | 9/10/1984 | 5/5/1987 | GLOW DISCHARGE METHOD OF APPLYING A CARBON COATING ONTO A SUBSTRATE | OVONIC SYNTHETIC MATERIALS CO. | 2.5 | 0 |
| | 04730970 | 11/12/198 | 3/15/1988 | Selectively hardened self drilling fasteners | WHYCO CHROMIUM CO., INC. | 2.5 | -1 |
| | 05740941 | 6/6/1995 | 4/21/1998 | Sheet material with coating | ** UNASSIGNED ** | 1.5 | 2 |
| | 05794801 | 6/6/1995 | 8/18/1998 | Material compositions | ** UNASSIGNED ** | 1.5 | 2 |
| | 05462772 | 5/13/1993 | 10/31/199 | Methods for forming artificial diamond | ** UNASSIGNED ** | 1.5 | 2 |
| | 05417776 | 8/4/1994 | 5/23/1995 | Hard austenitic stainless steel screw | DAIDOUSANSO CO. LTD. | 1.5 | 1 |
| | E0523298 | 7/18/1991 | 1/20/1993 | A hard austenitic stainless steel screw. | DAIDOUSANSO CO. LTD. | 1.5 | 1 |
| | E1319801 | 11/12/200 | 6/18/2003 | System for exchanging pick holders having tension screws | WIRTGEN GMBH | 1 | 1 |
| | 06595733 | 5/1/2000 | 7/22/2003 | Fastener having torque reducing thread | ** UNASSIGNED ** | 1 | 1 |
| | E0967452 | 9/20/1999 | 3/22/2000 | Thread tapping screw | ** UNASSIGNED ** | 1 | 1 |
| | E0429880 | 11/1/1990 | 6/5/1991 | Method for corrosion protection of rivets. | INDIVIDUAL PATENTER | 1 | 1 |

*Figure 4*

Screen Shot of Built-In Report for Showing Top Assignees for a Set of Neighbor Patents

*Top Neighbor Assignees from Search:*
Forward Search: fastener

| Assignee Parent | Industry | # Neighbor Patents | Total Weight | Advantage |
|---|---|---|---|---|
| Pactiv | Forest & Paper Prods. | 426 | 2086.5 | 1287 |
| Aluminum Company of | Metals | 391 | 1799 | 383 |
| Hilti AG | Machinery | 285 | 936 | -51 |
| Exxon Mobil Corp. | Energy | 263 | 1493 | -7 |
| Pentair Inc. | Electrical | 244 | 511.5 | 320 |
| SENCO PRODUCTS, INC. | Unknown | 237 | 861 | 19 |
| APPLIED TOOL | Unknown | 225 | 467.5 | 176 |
| Hitachi Koki Co Ltd | Electrical | 212 | 836 | 10 |
| Stanley Works | Consumer Products | 182 | 577.5 | 82 |
| Altria Group | Food, Bev. & Tobacco | 179 | 1014 | 359 |
| SC Johnson & Son Inc | Chemicals | 131 | 425 | 47 |
| SENCORP | Unknown | 123 | 423.5 | 7 |
| Black & Decker Corp, The | Machinery | 110 | 316 | 42 |
| Nifco Incorporated | Chemicals | 99 | 227 | -53 |
| INNOFLEX INC | Unknown | 93 | 380.5 | 111 |
| Textron Inc | Aerospace | 88 | 239 | 54 |
| Tyco International LTD | Electrical | 85 | 369 | 146 |
| KCL CORP. | Unknown | 74 | 417.5 | -2 |
| JOSEPH ADAMS | Unknown | 63 | 221.5 | -1 |
| Dow Chemical Co | Chemicals | 59 | 351.5 | -1 |
| Johnson & Johnson | Health Care | 58 | 210.5 | 19 |
| FLEXICO FRANCE | Unknown | 58 | 167.5 | 67 |
| Makita Corp. | Electrical | 58 | 154.5 | -6 |
| Max Co. Ltd. | Computers | 58 | 116.5 | 74 |
| Bemis Co Inc | Unknown | 57 | 230.5 | -1 |
| Northrop Grumman | Aerospace | 47 | 126 | 14 |
| MMM/Minnesota Mining & Mfg | Chemicals | 44 | 130 | 37 |
| Yoshida Kogyo KK | Consumer Products | 44 | 97 | 5 |
| PACMAC INC. | Unknown | 36 | 224.5 | 53 |
| POW-R TOOLS CORP. | Unknown | 35 | 153.5 | 1 |
| Clorox Co Inc | Chemicals | 35 | 95 | 27 |
| Robert Bosch GmbH | Automotive | 33 | 97.5 | 5 |
| INDIVIDUAL PATENTER | Unknown | 32 | 57 | 33 |
| HUNTSMAN KCL CORP | Unknown | 31 | 127 | 142 |
| JOH. FRIEDRICH BEHRENS | Unknown | 29 | 90 | 10 |
| KAPAK CORP. | Unknown | 27 | 166 | 16 |
| Areva Group | Energy | 26 | 81.5 | 8 |
| HAYTAYAN; HARRY M. | Unknown | 24 | 87.5 | -15 |
| Idemitsu Petrochemicals Co. | Unknown | 23 | 132 | 8 |
| JOH. FRIEDRICH BEHRENS | Unknown | 23 | 87 | 5 |
| DESA INT'L, INC. | Unknown | 23 | 77.5 | 0 |
| ABB Asea Brown Boveri | Engrng., Oil Field Svcs. | 23 | 76 | 2 |
| BERGNER (RICHARD) | Unknown | 23 | 65 | 50 |
| RECOIL-LESS PNEUMATIC | Unknown | 22 | 84.5 | -8 |
| HAUBOLD-KIHLBERG GMBH | Unknown | 22 | 76.5 | 2 |
| LIH JIE INDUSTRIAL CO | Unknown | 22 | 75.5 | -2 |
| Hunter Douglas NV | Consumer Products | 22 | 61.5 | 21 |
| PACKAGE MACHINERY CO., | Unknown | 21 | 121.5 | -15 |
| MASTERSET INC | Unknown | 21 | 77 | 1 |

Figure 5

Screen Shot of Built-in Report Displaying Source and Neighbor Patents for a Specified Search

*Source and Neighbors from Search:  Backward Search: pharma*

| | Patent | App. Date | Pub Date | Title | Assignee Parent(s) | Strength | Advantage |
|---|---|---|---|---|---|---|---|
| Source Patent: | 04692154 | 6/2/1986 | 9/8/1987 | CATHETER GUIDE | Illinois Tool Works Inc | | |
| *Neighbor Patents* | 06409717 | 3/21/1997 | 6/25/2002 | Hydrophilic urinary catheter having a water-containing sachet | AstraZeneca Plc | 1 | 1 |
| Source Patent: | 04694959 | 1/29/1986 | 9/22/1987 | MAINTAINING SINGLE LINK CHAIN BAGS AGAINST SKEWING | Illinois Tool Works Inc | | |
| *Neighbor Patents* | 06212855 | 4/13/1999 | 4/10/2001 | Drug bag strip winding and bundling machine | Yuyama Manufacturing Co. Ltd. | 1 | 1 |
| Source Patent: | 04723131 | 9/12/1986 | 2/2/1988 | Printhead for ink jet printing apparatus | Illinois Tool Works Inc | | |
| *Neighbor Patents* | E1099480 | 11/7/2000 | 5/16/2001 | Microdispensing system for the open-jet dispensing of liquids | Roche Holding Ltd | 1 | 1 |
| Source Patent: | 04759670 | 6/16/1986 | 7/26/1988 | Multi-purpose two-piece plastic fastener | Illinois Tool Works Inc | | |
| *Neighbor Patents* | E0232049 | 1/20/1987 | 8/12/1987 | Fixation device for a ligament or tendon | Pfizer Inc | 3 | 0 |
| | 04550448 | 2/18/1985 | 11/5/1985 | BONE PROSTHESIS WITH POROUS COATING | Pfizer Inc | 2 | 0 |
| | 04570623 | 6/2/1983 | 2/18/1986 | ARCHED BRIDGE STAPLE | Pfizer Inc | 2 | 0 |
| | 04828562 | 2/4/1988 | 5/9/1989 | ANTERIOR CRUCIATE LIGAMENT PROSTHESIS | Pfizer Inc | 2 | 0 |
| Source Patent: | 04765372 | 6/17/1983 | 8/23/1988 | Check valve | Illinois Tool Works Inc | | |
| *Neighbor Patents* | 04506691 | 3/28/1984 | 3/26/1985 | THREE-WAY VALVE FOR AUTOMATIC SEQUENCING OF FLUID FLOW | Alaris Medical Inc. | 3 | 0 |
| | 05334180 | 4/1/1993 | 8/2/1994 | Sterile formed, filled and sealed flexible container | Abbott Laboratories | 2 | 0 |

*Figure 6*

Screen Shot of Forward Search Form

Figure 7

Screen Shot of Backward Search Form searchneighborform : Form

Patent:
Appl Date:
Pri Date:
Pub Date:
Assignee:
Industry: "*pharma*"
Technology:
Text:
Search Name: pharma
Existing Searches: pharma
saveSearch    Do Search    Close Form

Figure 8

Screen Shot of the Main Analysis Form

Step 1: Build/Change Analysis Set(s)

[Build Forward Search Set] [Build Reverse Search Set]

Step 2: Build Work Files Using:

[Forward Search Only] [Backward Search Only] [Both Directions]

Step 3: View Forms and Reports Based on:

Forward Search: fastener

[Top Neighbor Assignees Report] [Top Neighbor Industries Report] [Top Neighbor Technologies Report]

[Source and Neighbors Report] [Neighbor Detail Report] [Source Detail Report]

Figure 9

Sample of First Generation Neighbor Table

| Source Patent | Neighbor | Type |
|---|---|---|
| 05011356 | 04762437 | back |
| 05011356 | 05306098 | forward |
| 05011356 | 05362187 | forward |
| 05011356 | 05368427 | forward |
| 05011356 | 05448809 | forward |
| 05011356 | 05511919 | forward |
| 05011356 | 05542799 | forward |
| 05011356 | 05592719 | forward |
| 05011356 | 05724709 | forward |
| 05011356 | 05975820 | forward |
| 05011356 | 06231266 | forward |
| 05011356 | 06568893 | forward |
| 05011356 | 06612795 | forward |
| 05011356 | 06684568 | forward |
| 05012620 | 05189842 | forward |
| 05012620 | 05295330 | forward |
| 05012620 | 05384095 | forward |
| 05012620 | 05476415 | forward |
| 05012620 | 05823861 | forward |
| 05012620 | 05989109 | forward |
| 05012620 | 06213854 | forward |
| 05012620 | 06296556 | forward |
| 05012620 | 06379233 | forward |
| 05012620 | 06656027 | forward |
| 05012620 | 06682401 | forward |
| . | . | . |
| . | . | . |
| . | . | . |

*Figure 12*

Sample of Second Generation Neighbors

| sourcePat | neighborPat | weight | advantage |
|---|---|---|---|
| 05011356 | 04652192 | 2 | -2 |
| 05011356 | 04762437 | 3.5 | -1 |
| 05011356 | 05306098 | 1.5 | 1 |
| 05011356 | 05362187 | 1 | 1 |
| 05011356 | 05368427 | 1 | 1 |
| 05011356 | 05448809 | 1.5 | 1 |
| 05011356 | 05511919 | 1 | 1 |
| 05011356 | 05542799 | 1 | 1 |
| 05011356 | 05592719 | 1.5 | 1 |
| 05011356 | 05724709 | 1 | 1 |
| 05011356 | 05975820 | 1 | 1 |
| 05011356 | 06231266 | 1 | 1 |
| 05011356 | 06568893 | 1.5 | 1 |
| 05011356 | 06612795 | 1.5 | 1 |
| 05011356 | 06684568 | 1 | 1 |
| . | . | . | . |
| . | . | . | . |
| . | . | . | . |

*Figure 14*

Steps Required to Create the Main Database Table from the Second Work Table

**Starting Table
(Work Table 2)**

| secondGeneration | |
|---|---|
| Field Name | Type |
| source patent | text |
| link | text |
| neighbor | text |
| type | text |
| weight | single |
| advantage | single |

SQL Query

```
SELECT secondGeneration.[Source Patent] AS sourcePat, secondGeneration.neighbor AS neighborPat,
Sum(secondGeneration.weight) AS weight, Sum(secondGeneration.advantage) AS advantage
FROM secondGeneration
GROUP BY secondGeneration.[Source Patent], secondGeneration.neighbor
ORDER BY secondGeneration.[Source Patent], secondGeneration.neighbor;
```

Main Table Created

| Main Table | |
|---|---|
| Field Name | Type |
| SourcePat | Text |
| NeighborPat | Text |
| weight | Double |
| Advantage | Double |

Figure 15

Set of Sample Records in Main Table

| Source Patent | neighbor | weight | advantage |
|---|---|---|---|
| 04493219 | 06329614 | 1.5 | 1 |
| 04493219 | 06496178 | 3 | 5 |
| 04493219 | 06552288 | 1 | 1 |
| 04493219 | 06607442 | 1 | 1 |
| 04493467 | 04493467 | 5 | 0 |
| 04493467 | 04640984 | 1 | 1 |
| 04493467 | 05115260 | 1 | 1 |
| 04493467 | 05243139 | 1 | 1 |
| 04493467 | 05285349 | 1 | 1 |
| 04493467 | 05414218 | 1.5 | 1 |
| 04493467 | 05657209 | 1 | 1 |
| 04493580 | 04493580 | 8 | 0 |
| 04493580 | 04644614 | 2.5 | 1 |
| 04493580 | 04712939 | 2 | 2 |
| 04493580 | 04860410 | 1 | 1 |

*Figure 16*

IDENTIFICATION OF LICENSING TARGETS USING CITATION NEIGHBOR SEARCH PROCESS

BACKGROUND OF THE INVENTION

1. Field of Invention

The present invention relates to a portable database that can be used by a client organization with substantial numbers of patents to identify target organizations that may be interested in licensing said patents. The database combines the power of citation analysis for identifying licensing targets with the power of citation neighbor searching for identifying similar patents and for overcoming some of the weaknesses inherent with citation analysis. One of the real strengths in this invention is the ability for a company to identify targets outside of its core industry that may be interested in licensing the technology in its patents.

2. Prior Art

With the realization that IBM receives more than $1 billion in revenues based on out-licensing of its patent assets, numerous companies with substantial patent holdings such as Intel, Microsoft, Hewlett-Packard and others have started to significantly increase the out-licensing of their patent assets. ("Microsoft opens technology to more licensing", Ina Fried, CNET News.com, Dec. 3, 2003; "HP seeks profits from its patents", Dawn Kawamoto and Ian Fried, CNET News.com, Feb. 24, 2003.)

U.S. Pat. No. 6,556,992 (Barney et al.) is an early patent recognizing the increased role of licensing programs, but this patent is primarily concerned with determining the value of a patent or patents and not with identifying the potential licensees of a patent or patents.

U.S. Published Patent Application No. 2002/0004775 (Kossovsky et al.) is an online licensing exchange which provides a method for licensees to find patent owners with relevant technology. However this is a passive system from the patent owners perspective and does not allow the patent owners to proactively search for potential licensees.

U.S. Published Patent Application No. 2002/0178029 (Nutter et al.) is a software system (Taeus Works) for both evaluating patent and for identifying licensees. However, the system depends on evaluative information supplied by the user in order to evaluate license potential of a patent. See, also, an undated brochure entitled "Patent Portfolio Management," from Taeus.

In a 1995 newsletter ("Patent Citation Analysis is a Tool for Technology Transfer," CHI's Research, May 1995) CHI Research discusses the use of forward-citations in identifying licensing targets. This is further discussed in an article, "The many applications of patent analysis," Breitzman and Mogee, Journal of Information Science, 2002, pp. 187-205. However, citation analysis provides no obvious way to identify licensees for recent patents and those that have no forward citations. Also, this method provides no way to cluster sets of patents that may be valuable as a set of patents to a particular licensee.

CHI Research's neighbor searching algorithm has been in use since 1987 and provides a means to identify patents that are technologically similar to a source patent or set of source patents. An example of the application of the algorithm performed in 2002 by CHI Research, Inc. for U.S. Pat. No. 5,647,993 (Karp) is shown in the Appendix below. However, this method has always been used as a means to strengthen a patent search or as the beginning of a larger analysis or patents. Also, since this algorithm mines the entire U.S. patent database to obtain neighbors for a specific patent or small set of patents, it could not be used in a portable database that can be given to clients for their own data mining. Moreover, the algorithm has no obvious use for licensing, because if an entire organization's portfolio were entered, a set of nonsensical results would be obtained after an interminable delay.

Accordingly, there is still a need for improved methods of identifying licensing targets for a portfolio of patents. The present invention fulfills such a need by combining citation analysis with a new improved neighbor searching method, such that a portable database can be created and given to clients such that they can (in real-time) mine their patent portfolios and find licensees. Moreover the weaknesses of citation analysis are overcome. Finally, the entire U.S. database need not be mined for each exploration so that datamining for licensees can be done in real-time and the proprietary information in the main database need not be sent to the client organization.

After considering the following description, those skilled in the art will be able to use the teachings of the present invention to create a database that uses the neighbor citation process to identify licensing targets.

BRIEF SUMMARY OF THE INVENTION

A process for identifying potential licensees for a portfolio of patents is implemented by performing at least the following steps:

1. Provide a database that includes the portfolio of patents, a set of patents that are neighbor patents with respect to the portfolio of patents, and a table that defines the neighbor relationship between the portfolio of patents and the set of neighbor patents.
2. Query the database with a search term of interest that exists in at least one of the patents in the database.
3. Output a result set based on the query that identifies potential licensees for the portfolio of patents.

BRIEF DESCRIPTION OF THE DRAWINGS

The above summary, as well as the following detailed description of a preferred embodiment of the invention, will be better understood when read in conjunction with the following drawings. For the purpose of illustrating the invention, there is shown in the drawings embodiments that are presently preferred, and an example of how the invention is used in a real-world project. It should be understood that the invention is not limited to the precise arrangements and instrumentalities shown. In the drawings:

FIG. 2 is a screenshot of the cover sheet of a CHI Research neighbor search. This particular one is from the previously referenced neighbor search of U.S. Pat. No. 5,647,993. However, the description of the algorithm appears in all such neighbor searches which have been sold or given to hundreds of clients, potential clients, academics, and others since 1987 when the algorithm was first developed.

FIG. 4 is a screen shot of a report (result set) generated by the database showing neighbor patents for two source patents from Illinois Tool Works.

FIG. 5 is a screen shot of a report (result set) showing the top assignees with the most neighbor patents linked to a subset of patents from Illinois Tool Works.

FIG. 6 is a screen shot of a report (result set) showing neighbor patents of Illinois Tool Works from the pharmaceutical industry.

FIG. 7 is a screen shot of a form within the database for doing forward searches based on subsets of a source portfolio of patents.

FIG. 8 is a screen shot of a form within the database for doing backward searches based on subsets of a neighbor patent set.

FIG. 9 is a screen shot of a form within the database for creating a search and then viewing standard reports based on said search. This is also known as the main analysis form.

FIG. 12 shows a sample of first generation neighbors.

FIG. 14 shows a sample of second generation neighbors.

FIG. 15 shows the steps involved in creating the main table within the database from the table of second generation patents.

FIG. 16 shows some sample records from the main database table.

DETAILED DESCRIPTION OF THE INVENTION

Figure 1:
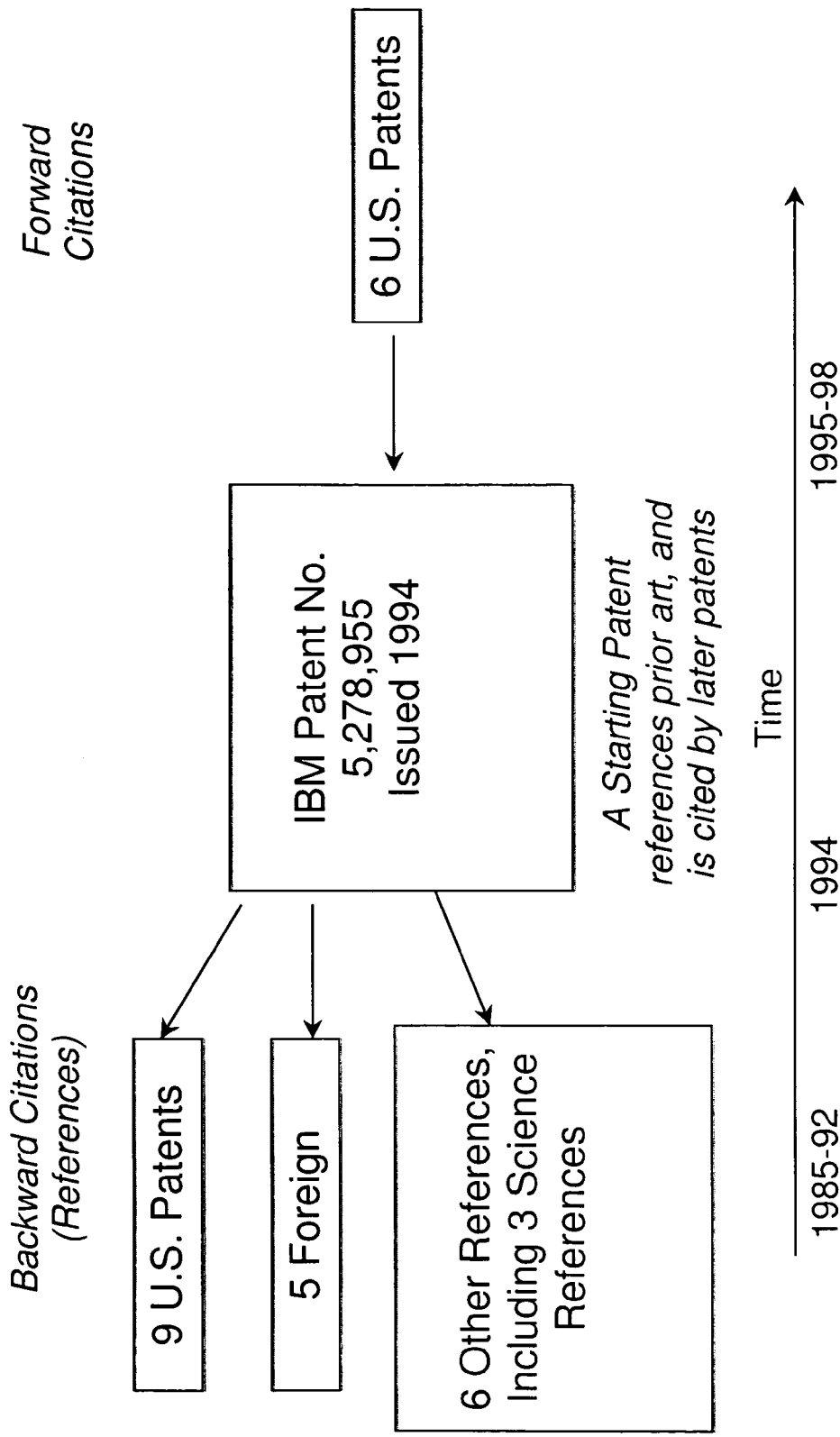
FIG. 1 is a visual schematic used to illustrate forward and backward citations.

Certain terminology is used herein for convenience only and is not to be taken as a limitation on the present invention. In the drawings, the same reference letters are employed for designating the same elements throughout the several figures.

1. Definitions

The following definitions are provided to promote understanding of the invention.

Source Patent—is any single starting patent of interest.

Source Set—is one or more patents in a portfolio of patents of interest.

Neighbor Patent—is a patent that is linked to a source patent or source set of patents via forward-citation, backward citation or multiple generations of citations. The concept of neighbor as well as forward and backward citations is discussed in detail in the specification below.

Neighbor Set—is a set of patents that neighbors of specific source set of patents.

Metadata—for a patent, refers to data not included in the published patent document but optionally added to the database for each patent record. Examples include an industry designation for the assignee (e.g., pharma industry, semiconductor industry etc.), a business unit designation, or broad technology designation such as biotechnology, software, etc.

2. Detailed Disclosure

A. First Preferred Embodiment

FIG. 1 illustrates the basic idea of forward and backward citations. A 1994 IBM patent, U.S. Pat. No. 5,278,955 (Forte et al.) is shown that references 9 earlier US patents, 5 foreign patents and 6 non-patent references. These references represent prior art for the IBM patent. These references are also known as backward citations. When later patents issue and reference the IBM patent, these references to the IBM patent are known as forward citations. FIG. 1 shows that the IBM patent has received 6 forward citations.

The terminology of forward and backward citations is useful when discussing the neighbor search algorithm because a neighbor search is essentially a compiling of all combinations of multiple generations of forward and backward citations between a source patent (or portfolio of patents) and all other patents.

FIG. 2 is a screen shot of the cover page that appears on CHI neighbor searches. In terms of the forward and backward citation terminology a neighbor search identifies all patents that have links to a source patent A. Each patent identified in the neighbor search has a strength (essentially a closeness measure) between it and source patent A that is determined by the number and type of link between said patent and source patent A.

More precisely if patent B is a neighbor of source patent A, the closeness or strength between A and B is determined by counting up all links between A and B based on the following weighting scheme.

Forward Citations have weight 1.0.
Backward Citations have weight 1.0.
Forward-Forward Citations have weight 0.5.
Forward-Backward Citations have weight 0.5.
Backward-Backward Citations have weight 0.5.
Backward-Forward Citations have weight 0.5.
Forward-Forward-Forward Citations have weight 0.333.
etc.

In the preferred embodiment, a maximum of two generations are used. Clearly the number of generations used can be extended beyond 3 and the weighting can be changed in alternative embodiments.

Figure 3:
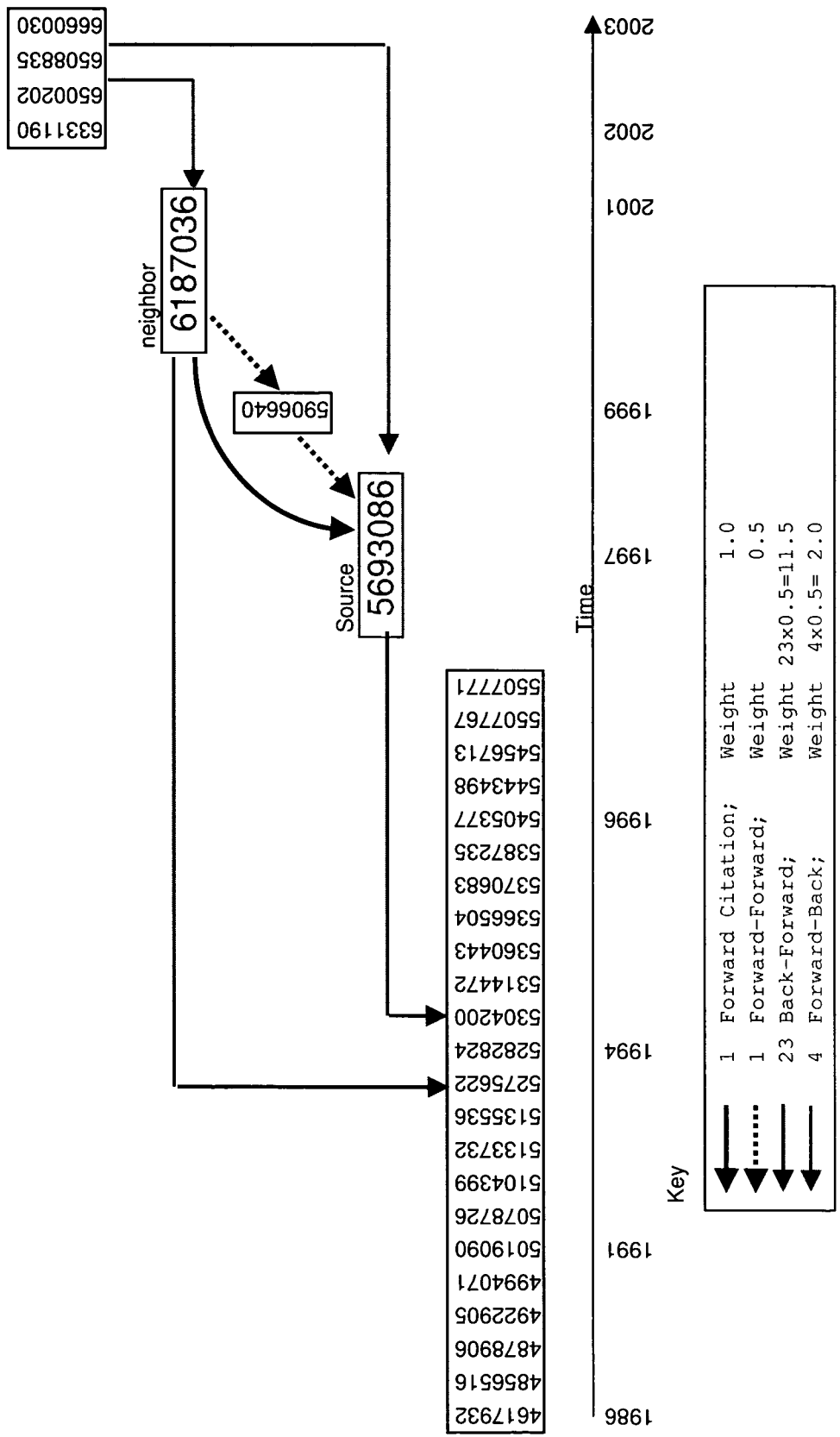
FIG. 3 is schematic showing in detail the neighbor relationship between a source patent and a neighbor patent.

FIG. 3 shows a neighbor patent, U.S. Pat. No. 6,187,036 (Shaolian et al.) that is related to source patent, U.S. Pat. No. 5,693,086 (Goicoechea et al.) with a total strength of 15. (The example has been modified with additional patent links for illustration purposes.) This strength is determined as shown based on a forward citation with weight 1, a Forward-Forward citation with weight 0.5 where U.S. Pat. No. 5,693,086 is cited by U.S. Pat. No. 5,906,640 (Penn et al.) which is then cited by U.S. Pat. No. 5,187,036 (Matsui et al.), 23 backforward citations weighted 0.5 each and 4 forward-back citations weight 0.5 each. To clarify things further, one of the 23 back-forward citations will be discussed. U.S. Pat. No. 4,617, 932 (Kornberg et al.) is cited by the source patent and also by the neighbor patent. Thus the path between the source and neighbor patent is back-forward, since U.S. Pat. No. 4,617, 932 is a backward citation from the source patent, and then U.S. Pat. No. 4,617,932 is forward cited by the neighboring patent.

The complete neighbor search referenced earlier (neighbor of U.S. Pat. No. 5,647,993 referenced above) and included with this application consists of all neighbors to U.S. Pat. No. 5,647,993. The process for producing such a neighbor list consists of searching through the entire database for each source patent and compiling the set of neighbors. This can be time consuming and requires access to the entire US patent database.

The portable licensing database disclosed herein is best described via an example. For the remainder of this document, a database will be discussed that contains patents from Illinois Tool Works and its neighbors. Illinois Tool Works has obtained about 5000 U.S. patents in the last 20 years and will likely have a significant number of licensable patents. The company was chosen arbitrarily as a midsize example. Illinois Tool Works produces small special-application engineered products and systems, including metal and plastic components, tools and small assemblies.

The present invention improves on the basic neighbor search algorithm described above by precomputing each neighbor of every patent contained in the database so that neighbor sets can be built in real time for any subset of patents within the database. As an example within the database it is possible to identify all neighbors of a subset of a portfolio of patents (source patents) that mention certain keywords.

Specifically, in the current example the database is searched for all Illinois Tool Works' patents that mention the keyword 'fastener' in their title. There are 321 such source patents and about 3400 neighbor patents.

FIG. 4 shows a screen shot of a single page of the 300 plus page report (result set) showing all source patents that mention 'fastener' along with all of the neighbor patents. This report shows all neighbors with a strength of 1 or more. Strength was discussed above.

A feature of the current invention is the idea of a licensing advantage shown in the report of FIG. 4. As discussed above, a patent that references an earlier patent (a forward citation for the source patent) is a potential licensing target for the earlier patent. For this reason an advantage is computed based on forward citation links between the source patent and neighbor patents. Specifically, all links are totaled and forward links and forward-forward links are each counted +1 each and backward links and backward-backward links are counted −1 each (Forward-backward, and backward-forward links count 0). This suggests that in FIG. 4 the Max Co. is a better licensing candidate than Hilti AG.

Since the goal is to identify companies that will license the patents of the target company (Illinois Tool Works in this case), identifying the individual neighbor patents is less useful than identifying the companies with the most neighbor patents. FIG. 5 shows a result set containing top assignees with the most neighbor patents related to the source patents that mention 'fastener.' Specifically, the result set shows that Pactiv has 426 patents that are neighbors to the 321 Illinois Tool Works patents that mention 'fastener.' The 426 neighbor patents have a total strength of 2086.5 which suggests that the average strength of each neighbor is roughly 5. Similarly, the average advantage is about 3 for Pactiv, which suggests that Pactiv is a good licensing target for Illinois Tool Works' fastener patents. Conversely, Hilti AG is a bad choice for a licensing target for this subset of Illinois Tool Works patents.

In these examples, the subset of source patents was chosen based on keywords. However, it is possible to search via any search term of interest. The search terms may include any field within the patent including, keywords in the text, patent numbers, assignees, patent classifications, or meta-data not included in the patent but optionally added to each patent record such as a pre-built technology category, (for example, many companies have their patents pre-bucketed by business unit), or industry category based on assignee (e.g. semiconductor industry, pharma industry etc.).

The examples described so far are from the source patent side (patent portfolio subsets from Illinois Tool Works in this case). It is also possible to search for specific subsets of neighbor patents in order to find licensees from a specific industry, technology, or assignee. (A search from the source patent portfolio perspective is called a forward search, and a search from the neighbor set perspective is called a backward search.) For example, FIG. 6 shows a subset of neighbor patents based on a backward search of patents from the Pharmaceutical industry. By listing the neighbor assignees based on this backward search, it would be possible to identify the best licensing assignee candidates from the pharmaceutical industry.

Both forward and backward searches can be combined, so that for example, combining the two discussed examples, a new subset could be created consisting of all source patent neighbor combinations where the source patents mention fastener and the neighbor patents come from the pharmaceutical industry.

Figure 7:
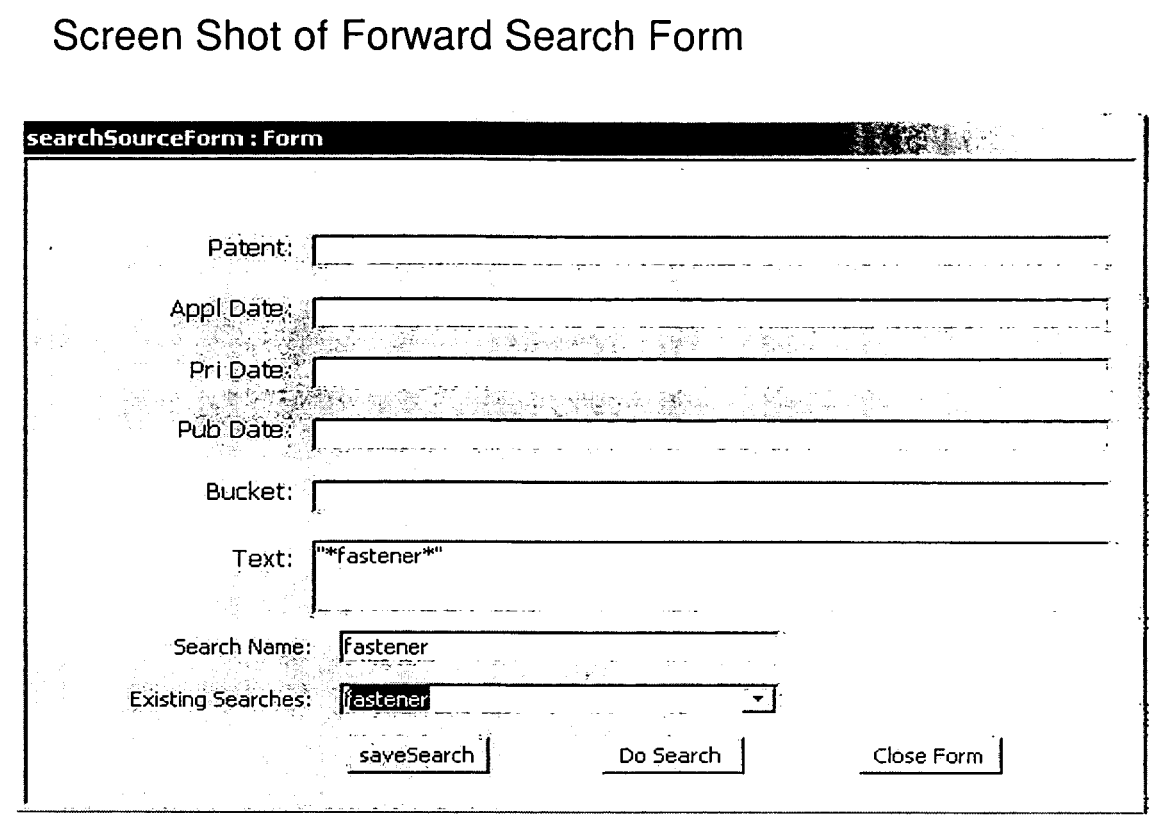

FIG. 7 shows a screen shot of the forward-search form used for doing the fastener example above. Note that the forward search also allows for entering specific date ranges, or specific patent numbers, or predefined technology buckets as well as patents that mention specific keywords.

FIG. 8 shows a screen shot of the backward-search form used for doing the pharmaceutical industry example above. Note that the backward search also allows for entering the specific date ranges, specific patent numbers, predefined technology buckets, specific assignees, or neighbor patents that mention specific keywords.

FIG. 9 shows a screen shot of the main analysis form of the database. The reports discussed above are done in three steps. In the first step, the user builds a search set via the search forms shown in FIG. 7 and FIG. 8 via the top left button or the top right button. Once a search is defined, the analysis is set via one of the three middle buttons. For example the fastener forward analysis set was built by using the 'forward search only' button, the pharmaceutical industry backward analysis set was built using the 'backward search only' button, and to create a subset of source patents that mention 'fastener' linked to neighbors from the pharmaceutical industry, the 'both directions' button is used.

Once an analysis set is defined, a variety of reports can be generated. Two of the reports were shown in the previous examples. The detail reports include source detail reports which show abstracts and claims for any of the source patents, neighbor detail reports which show the same for the neighbor patents. The top neighbor industry and Top neighbor technology reports are similar to the assignee report shown in FIG. 5, except they show lists of industries or technology categories. The source and neighbors report was shown in FIG. 6.

In the examples above, reports were shown for identifying licensees from the pharmaceutical industry or licensees with patents related to fasteners. To review, the main idea is to provide a database to someone (in this case, Illinois Tool Works) that will allow him/her to identify potential licensees for their portfolio. Moreover, that portfolio can be mined both forwards and backwards by identifying specific subsets of patents of interest in the source set or specific neighbor patents of interest.

The fastener and pharmaceutical examples illustrate how someone might use the database. Next, a number of examples are shown to further gain an appreciation of the power of the method. Many companies wish to identify patents that their competitors find to be of interest so that they can use that knowledge in a cross-licensing negotiation. As an example, Illinois Tool Works might wish to examine the neighbor patents and neighbor assignees of the subset of patents it owns related to machine tools. Further, they may be negotiating a cross-license with Caterpillar Tractor and may wish to identify all source-neighbor patent combinations where the neighbor patents are owned by Caterpillar Tractor.

Another frequent problem is that companies do a good job of licensing their patents in their core technologies but do a poor job of licensing their patents outside of their industries. By using the backward search feature, a user may find patents from the source company (Illinois Tool Works) that are useful to companies outside of the tool industry. Specifically it is easy to find neighbor patents from the food, pharmaceutical, or forestry industry that build upon (and thus are neighbors of) patents from Illinois Tool Works. Further, it is possible to drill down further, to identify the specific patents of say, Pfizer, which are neighbors of Illinois Tool Works.

At this point, an overview of using the database has been provided. The key tables within the database and how they are produced are now discussed so that someone skilled in the art could produce such a database.

Figure 10:
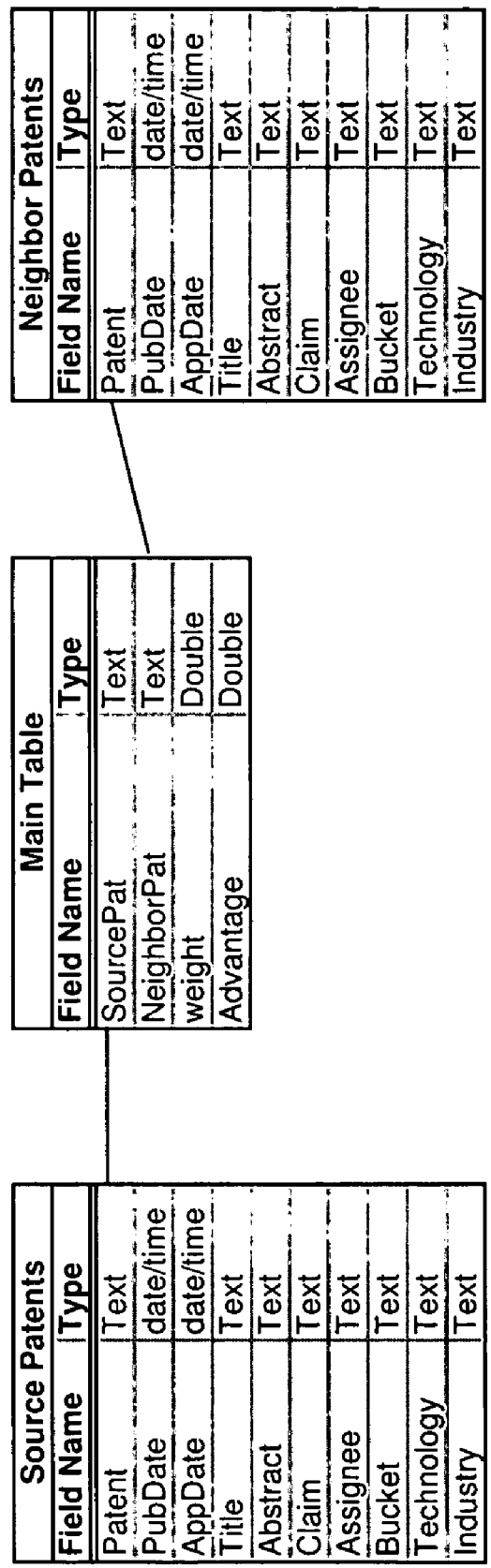
FIG. 10 shows the database schema; that is, the three tables that make up the portable neighbor database.

FIG. 10 shows the three tables that are included in the database. The main table consists of all combinations of source-neighbor pairs along with the strength and the advantage as discussed above. The other tables contain all of the basic information (dates, titles, assignees, and so on) for the source and neighbor patents respectively.

Note that since the strengths and advantages are additive, the strengths and advantages for any subset can be computed in real-time using the precomputed strengths and advantages in the main table. For example, in FIG. 5 discussed above, Pactiv had 426 neighbor patents related to Illinois Tool Works patents that mentioned the word "fastener." The total strength of 2086.5 was obtained by adding up the strengths for the 426 source patent-neighbor records in the main table where the source patents mention fastener and the neighbor patents are owned by Pactiv. This can be done in real-time because the strengths for the individual source-neighbor patents are pre-computed. Thus, if the search is modified such that the neighbor patents are from Pactiv and have issue dates between 1995 and 1996, the total number of neighbors and the total strength will be instantly recomputed and reduced. The same can be said for the advantage computations.

This is a significant improvement over the original neighbor algorithm where a specific set of neighbors was identified by querying the entire U.S. patent system for all links to a set of source patents. The strengths were then computed, and if a new source set was desired, the process would have to be completely repeated. This unwieldy process is avoided in the current invention by use of the main table in FIG. 10. This table is created once for all neighbors of all source patents and then neighbor subsets can be obtained in real-time without re-querying (or including all patents in) the entire database.

It will be clear to anyone with basic skill in the art on how to populate the source patent table and neighbor patent table of FIG. 10, since they just contain basic information (such as dates, assignees, titles, etc.) for each patent. Thus, the main discussion will focus on how to populate the main table in FIG. 10.

Figure 11:
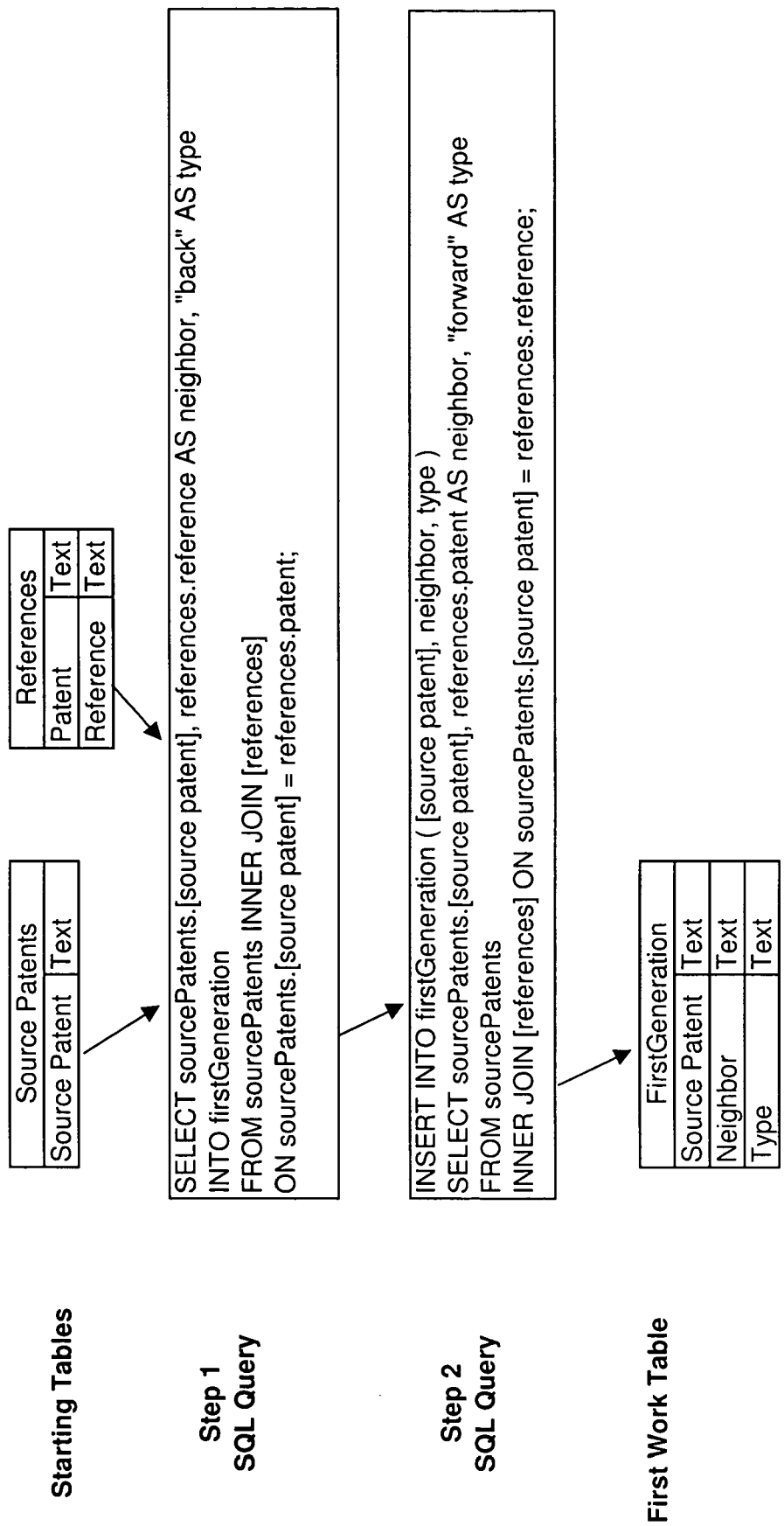
FIG. 11 shows the steps involved in creating a set of first generation neighbors from a portfolio of patents (source set).

The main table is built using a standard database containing patents and their references and two intermediate work tables called firstGeneration and secondGeneration. The latter two worktables are temporary tables created in order to make the main table and then discarded. Here, the patent database is a relational database with a table called references that contains a patent and reference pair for every reference of every patent in the database. One assumes that another table of source patents exists that contains all patents owned by Illinois Tool Works. FIG. 11 shows these two starting tables along with the steps necessary to build the first work table called firstGeneration. A set of sample records from the work table firstGeneration is shown in FIG. 12.

Figure 13:
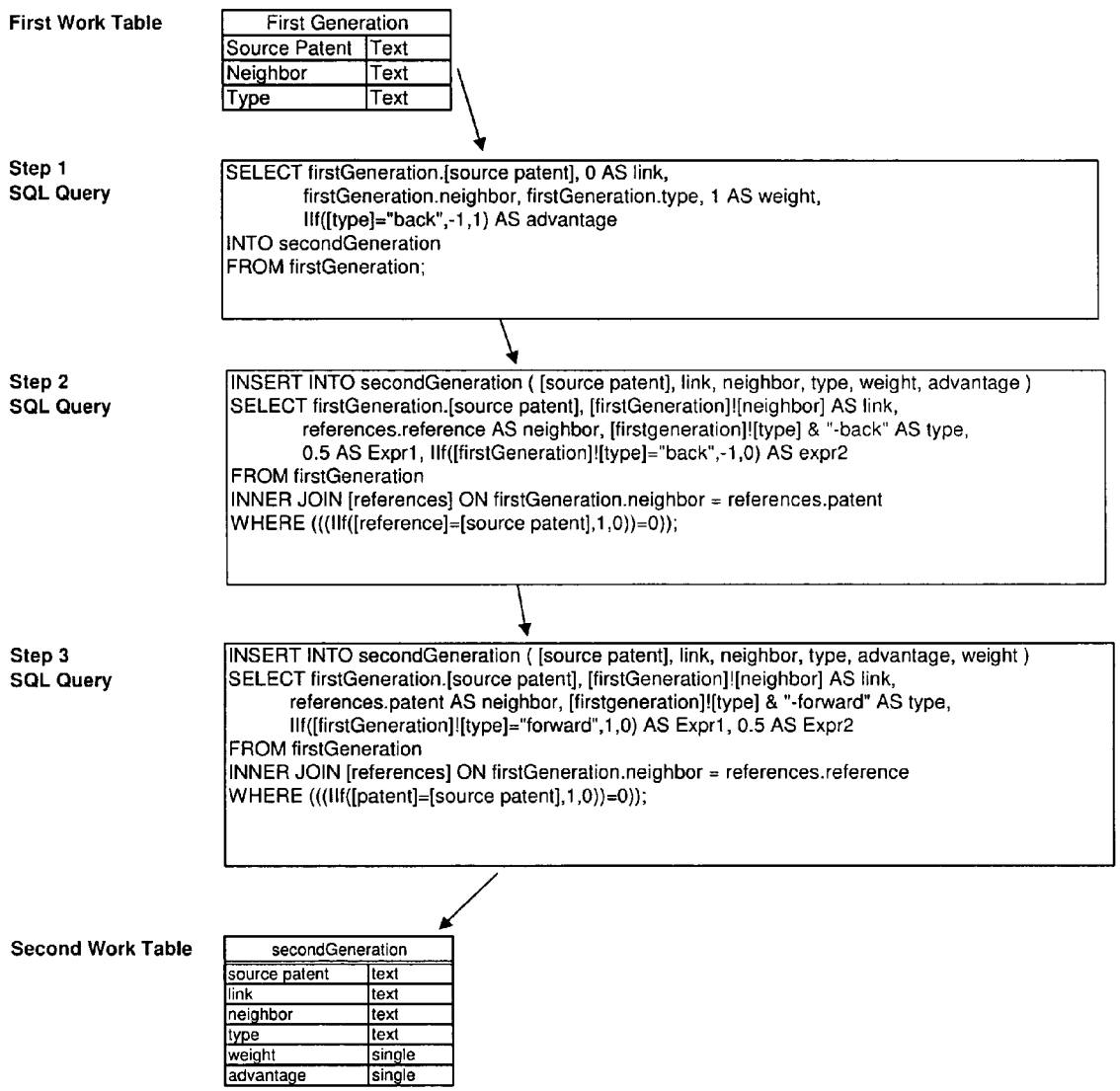
FIG. 13 shows the steps involved in creating a set of second generation neighbors from a set of first generation neighbors.

FIG. 13 shows the steps necessary for creating a second work table from the first generation work table. FIG. 14 shows some sample records from this second work table called secondGeneration.

FIG. 15 shows the steps necessary for creating the main table in the neighbor database from the second generation work table. FIG. 16 shows some sample records from the main table. It is important to note that the two work tables are not included in the neighbor database. These two tables are used to create the main table for use in the neighbor database, but are then excluded from the client's database. In this way, the client gets the advantage of the neighboring algorithm without requiring a large amount of proprietary data. This is significant because the intermediate links used to create the neighbors often require ten times the number of records as the main table that is included. For example, in the Illinois Tool Works example database, the first work table (firstGeneration) has 24,633 records, the second work table (secondGeneration) has 678,152 records, but the main table of source-patent neighbor pairs contains only 76,031 records. Again, the reason the main table can be reduced from the second work table and that table discarded is because the strengths and advantages are additive.

The neighbor database and how it is produced has now been completely described.

B. First Alternative Embodiment

The first preferred embodiment used neighbors built from up to two generations of citations and references. An alternative embodiment can use more than two generations of citations and references to create the neighbor database.

C. Second Alternative Embodiment

A second alternative embodiment includes the two work tables discussed above, (firstGeneration and secondGeneration). It is most often desirable to exclude the work tables for the reasons discussed above (size and proprietary information). However, for some clients it may be desirable to allow them to identify the intermediate links that cause sets of patents to be neighbors.

D. Third Alternative Embodiment

A third alternative embodiment uses essentially the same algorithm but uses different weights for neighbor clustering other than 1.0 for first generation citations, 0.5 for second generation citations, and 0.333 for third generation citations.

The present invention may be implemented with any combination of hardware and software. If implemented as a computer-implemented apparatus, the present invention is implemented using means for performing all of the steps and functions described above.

The present invention can be included in an article of manufacture (e.g., one or more computer program products) having, for instance, computer readable media. The media has embodied therein, for instance, computer readable program code means for providing and facilitating the mechanisms of the present invention. The article of manufacture can be included as part of a computer system or sold separately.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

APPENDIX

The search was performed at level 2 All neighbors have been listed. Patents other than "type 1" patents are included, if any occur. If a patent was not found in the major data-base, it was not listed. Assignees have been unified Linkages for all neighbors are not included in this report. The patent tree (tracing) is not included in this report. A patent file of neighbors was made.

BRIEF EXPLANATION OF CHI RESEARCH PATENT CITATION NEIGHBOR SEARCHES

CHI's Patent Citation Neighbor Search finds patents linked to a given source patent by references (citations). For example, if the front page of patent A, under the heading "references cited" lists patent B as a reference, then we say patent A cites patent B. This establishes a link of strength 1.0 between patents A and B. If patent B, in turn, cites patent C, this establishes a link of strength ½ between patents A and C. Similarly, if A cites B, B cites C and C cites D, then the strength of the link between A and D is ⅓.

EXAMPLE

A ---references--> B ---references--> C ---references--> D

Patent A is linked to patent B with strength 1.
Patent A is linked to patent C with strength ½.
Patent A is linked to patent D with strength ⅓.

CHI's standard Patent Citation Neighbor Search finds all patents linked to the given source patent by links of strength ⅓ or more. Any pair of patents may be linked through many different referencing paths. The Neighbor Search lists the linked patents in order, most strongly linked listed first, where strength is defined as the sum of strengths for each unique path connecting the pair. The most strongly linked patent to the given source patent is, in this sense, the 'nearest neighbor' patent.

EXAMPLE

Path 1: A ---references--> B ---references--> D
Path 2: A ---references--> B ---references--> C ---references--> D In Path 1, patent A is linked to patent D with strength ½.
In Path 2, patent A is linked to patent D with strength ⅓.
The total strength of the links between patents A and D is 0.83.

The Patent Citation Neighbor Search which follows contains four sections:

Section 1: List of Neighbors
    Provides a complete list of all neighboring patents to the given souce patent that are linked with strength at least ⅓. For each neighboring patent the patent number, total strength, year, class/subclass, title, and assignee are given.

Section 2: List of Neighboring Assignees
    Summarizes the neighboring patents surrounding the given source patent according to assignee of the neighboring patents.

Section 3: List of Neighboring Classes
    Summarizes the neighboring patents surrounding the given source patent according to major patent class.

Section 4: List of Linkages
    Shows in complete detail all the referencing pathways used in establishing the total strength of the relationship between the given source patent and every neighboring patent.

An explanatory brochure and more information are available from:

Chi Research, Inc. White Horse Pike Haddon Heights, N.J. 08053 (609) 546-0600

| Rank | Number | Strength | Year | 1st US Class | Patent Title | Assignee | Cites | NPR | TCT |
|---|---|---|---|---|---|---|---|---|---|
| 1 | 05282963 | 5.50 | 1994 | 210/223.000 | Magnetically attached magnet for oil filters | ** UNASSIGNED ** | 5 | 0 | 8.5 |
| 2 | 05078871 | 4.50 | 1992 | 210/222.000 | Magnetic oil filter particle trap | ** UNASSIGNED ** | 16 | 0 | 18.5 |
| 3 | 05817233 | 4.00 | 1998 | 210/223.000 | Magnetic filtering apparatus | FLUID MAGNETICS INC | 1 | 2 | 8.5 |
| 4 | 05354462 | 4.00 | 1994 | 210/223.000 | Magnetic filter strap | OWEN; SHANE MARIE | 6 | 0 | 20.0 |
| 5 | 05556540 | 3.50 | 1996 | 210/222.000 | Magnetic assembly for a closed pressurized flow path of lubricating oil | ** UNASSIGNED ** | 4 | 0 | 10.0 |
| 6 | 04894153 | 3.50 | 1990 | 210/222.000 | MAGNETIC ATTACHMENT FOR A FILTER | ** UNASSIGNED ** | 10 | 0 | 21.5 |
| 7 | 05571411 | 3.00 | 1996 | 210/223.000 | Magnetic attachment for filtering oil | ** UNASSIGNED ** | 2 | 0 | 6.5 |
| 8 | 04826592 | 3.00 | 1989 | 210/223.000 | MAGNETIC FILTER APPARATUS | ** UNASSIGNED ** | 10 | 0 | 20.5 |
| 9 | 04218320 | 3.00 | 1980 | 210/223.000 | Lubricating oil filter device | ** UNASSIGNED ** | 13 | 0 | ** |
| 10 | 05716517 | 2.50 | 1998 | 210/130.000 | Filter assembly including a magnetized component | DANA CORP. | 0 | 0 | 29.3 |
| 11 | 04629558 | 2.50 | 1986 | 210/130.000 | OIL AND FUEL FILTER | FERROFILTA PTY LTD. | 16 | 0 | 27.5 |
| 12 | 04450075 | 2.50 | 1984 | 210/223.000 | Magnetic oil filter insert | ** UNASSIGNED ** | 13 | 0 | 20.5 |
| 13 | 04446019 | 2.50 | 1984 | 210/223.000 | Magnetic filtration in a spin-on fluid filter | DONALDSON CO., INC. | 18 | 0 | 24.3 |
| 14 | 06139737 | 2.00 | 2000 | 210/223.000 | Transmission fluid filter having a ferrite-filled nylon magnetic body | SPX CORP. | 0 | 0 | 22.8 |
| 15 | 05273648 | 1.50 | 1993 | 210/222.000 | Filter cartridge magnetic belt | ** UNASSIGNED ** | 5 | 0 | 12.5 |
| 16 | 05089129 | 1.50 | 1992 | 210/223.000 | Fluid contaminate filtration system including a filter, a contaminate particle trap, and a cold start fluid circulation system | ** UNASSIGNED ** | 18 | 0 | 11.0 |
| 17 | 04851116 | 1.50 | 1989 | 210/222.000 | MAGNET FILTER | ** UNASSIGNED ** | 9 | 0 | 29.3 |
| 18 | 04592836 | 1.50 | 1986 | 210/168.000 | ELECTROSTATIC ENGINE OIL CLEANER | ** UNASSIGNED ** | 6 | 0 | 15.5 |
| 19 | 04501660 | 1.50 | 1985 | 210/209.000 | OIL FILTER | ** UNASSIGNED ** | 6 | 0 | 24.5 |
| 20 | 06210572 | 1.00 | 2001 | 210/223.000 | Filter and method for purifying liquids containing magnetic particles | TECHNOLOGY COMMERCIALIZATION CORP | 1 | 1 | 19.3 |
| 21 | 06207050 | 1.00 | 2001 | 210/223.000 | Magnetic core for an oil filter | ** UNASSIGNED ** | 1 | 0 | 11.5 |
| 22 | 06007716 | 1.00 | 1999 | 210/223.000 | Magnetic filtration device | WHITE LIGHTNING PREVENTATIVE MAINTENANCE INC | 0 | 1 | 10.5 |
| 23 | 05441647 | 1.00 | 1995 | 210/695.000 | Magnetic device for removing metallic matter from lubricating fluids | ** UNASSIGNED ** | 6 | 0 | 6.5 |

-continued

| Rank | Number | Strength | Year | 1st US Class | Patent Title | Assignee | Cites | NPR | TCT |
|---|---|---|---|---|---|---|---|---|---|
| 24 | 05389252 | 1.00 | 1995 | 210/223.000 | Magnetic filter aid | ** UNASSIGNED ** | 5 | 0 | 11.5 |
| 25 | 05345462 | 1.00 | 1994 | 372/045.000 | Semiconductor surface emitting laser having enhanced polarization control and transverse mode selectivity | LUCENT REASSIGNED FROM AT&T | 10 | 9 | 3.5 |
| 26 | 05314625 | 1.00 | 1994 | 210/695.000 | External oil pan magnet | ** UNASSIGNED ** | 6 | 0 | 9.5 |
| 27 | 04763092 | 1.00 | 1988 | 335/305.000 | Magnetic filter | ** UNASSIGNED ** | 7 | 0 | 23.5 |
| 28 | E0750374 | 0.50 | 1996 | | Method and apparatus for back facet control of laser diode power output | XEROX CORP. | 0 | 2 | 6.5 |
| 29 | E0744986 | 0.50 | 1996 | | MAGNETIC FILTRATION DEVICE | WHITE LIGHTNING PREVENTATIVE MAINTENANCE INC | 0 | 0 | 2.8 |
| 30 | E0728527 | 0.50 | 1996 | | Magnetic drain bolt | ILLINOIS TOOL WORKS, INC. | 0 | 0 | 8.5 |
| 31 | E0711195 | 0.50 | 1996 | | MAGNETIC FILTER ADAPTER | ** UNASSIGNED ** | 0 | 0 | 16.5 |
| 32 | E0673277 | 0.50 | 1995 | | MAGNETIC FILTER STRAP | OWEN; SHANE MARIE | 0 | 0 | 22.5 |
| 33 | E0356832 | 0.50 | 1990 | | Fuel filter. | KNECHT FELTERWERKE GESELLSCHAFT MIT BESCHRAENK | 0 | 0 | ** |
| 34 | E0237923 | 0.50 | 1987 | | Filter module. | INDIVIDUAL PATENTER | 1 | 0 | 15.5 |
| 35 | E0110674 | 0.50 | 1984 | | Apparatus for the removal of solid particles from printing ink or other liquids. | DAI NIPPON INSATSU KK | 1 | 1 | 10.0 |
| 36 | 06337012 | 0.50 | 2002 | 210/223.000 | Universal magnetic filter insert | ** UNASSIGNED ** | 0 | 7 | 13.0 |
| 37 | 06285527 | 0.50 | 2001 | 360/099.080 | Disc drive having hydrodynamic labyrinth seal and magnet shield | SEAGATE TECHNOLOGY LLC | 0 | 8 | 8.7 |
| 38 | 06224754 | 0.50 | 2001 | 210/130.000 | Filter head and liquid filter assembly with valve arrangements | DONALDSON CO., INC. | 0 | 0 | 16.5 |
| 39 | 06217755 | 0.50 | 2001 | 210/116.000 | In-tank fluid filter with valve assembly | DONALDSON CO., INC. | 0 | 0 | 15.8 |
| 40 | 06188711 | 0.50 | 2001 | 372/096.000 | Polarization-controlled VCSELs using externally applied uniaxial stress | AGILENT TECHNOLOGIES | 0 | 6 | 6.3 |
| 41 | 06165355 | 0.50 | 2000 | 210/131.000 | Fluid filter having a three way valve construction | DONALDSON CO., INC. | 0 | 0 | 15.8 |
| 42 | 06159367 | 0.50 | 2000 | 210/222.000 | Telescopic housing for a magnet array | ** UNASSIGNED ** | 0 | 0 | 8.5 |
| 43 | 06156201 | 0.50 | 2000 | 210/416.400 | Fuel filter with return path for reducing electrical charge buildup | AISAN KOGYO KK | 0 | 0 | 4.0 |
| 44 | 06151344 | 0.50 | 2000 | 372/038.000 | Automatic power control of semiconductor laser | MOTOROLA INC. | 0 | 1 | 9.3 |
| 45 | 06126835 | 0.50 | 2000 | 210/695.000 | Device and method for magnetic separation of biological molecules | BIOCRYSTAL LTD | 0 | 0 | 8.5 |
| 46 | 06126823 | 0.50 | 2000 | 210/206.000 | Spin-on coolant filter | DONALDSON CO., INC. | 0 | 0 | 14.3 |
| 47 | 06117318 | 0.50 | 2000 | 210/222.000 | Rotating motorized conveyor pulley drum having a magnetic particulate trap | EMERSON ELECTRIC CO. | 0 | 0 | 28.0 |
| 48 | 06110380 | 0.50 | 2000 | 210/695.000 | Device and method for magnetic separation of biological molecules | BIOCRYSTAL LTD | 0 | 0 | 8.5 |
| 49 | 06107906 | 0.50 | 2000 | 335/306.000 | Magnet array and support bracket | ** UNASSIGNED ** | 0 | 0 | 20.0 |
| 50 | 06096208 | 0.50 | 2000 | 210/249.000 | Seal arrangement for spin-on filters | DONALDSON CO., INC. | 0 | 0 | 15.5 |
| 51 | 06083381 | 0.50 | 2000 | 210/086.000 | Fuel filter with sediment drain valve and level indicator | DONALDSON CO., INC. | 0 | 0 | 13.5 |
| 52 | 06055126 | 0.50 | 2000 | 360/099.080 | Disc drive having hydrodynamic labyrinth seal and magnet shield | SEAGATE TECHNOLOGY, INC. | 0 | 8 | 7.0 |
| 53 | 06024869 | 0.50 | 2000 | 210/130.000 | Spin-on filter assembly with valve arrangements | DONALDSON CO., INC. | 1 | 0 | 15.3 |
| 54 | 06012485 | 0.50 | 2000 | 137/558.000 | Fluid filter arrangement including valve arrangement, fluid level indicator, and methods thereof | DONALDSON CO., INC. | 1 | 0 | 12.8 |
| 55 | 05995531 | 0.50 | 1999 | 372/096.000 | VCSEL having polarization control and method of making same | MOTOROLA INC. | 0 | 0 | 3.0 |
| 56 | 05969903 | 0.50 | 1999 | 360/099.080 | Magnetic particle trap for hydrodynamic bearing | SEAGATE TECHNOLOGY, INC. | 0 | 7 | 6.6 |
| 57 | 05956204 | 0.50 | 1999 | 360/098.070 | Magnetic disc drive having magnetic particle trap for hydrodynamic bearing | SEAGATE TECHNOLOGY, INC. | 2 | 7 | 6.7 |
| 58 | 05944987 | 0.50 | 1999 | 210/180.000 | Multipurpose combinatory oil, air, gas, & pollution filtration system | ** UNASSIGNED ** | 0 | 0 | 13.3 |
| 59 | 05888384 | 0.50 | 1999 | 210/130.000 | Liquid filter | FILTERWERK MANN & HUNNEL GMBH | 2 | 0 | 8.5 |
| 60 | 05886972 | 0.50 | 1999 | 369/116.000 | Recording information in a phase change optical medium with a vertical cavity surface emitting laser | MOTOROLA | 2 | 0 | 3.8 |
| 61 | 05885447 | 0.50 | 1999 | 210/132.000 | Liquid filtration system incorporating a bypass filter element | DONALDSON CO., INC. | 0 | 0 | 13.8 |
| 62 | 05872310 | 0.50 | 1999 | 073/053.050 | Method for maintaining clean surfaces for valve seat faces of internal combustion engine | INDIVIDUAL PATENTER | 0 | 0 | 14.0 |
| 63 | 05850408 | 0.50 | 1998 | 372/027.000 | Method of driving semiconductor laser with wide modulation band, optical communication method, semiconductor laser device, node, and optical communication system | CANON KK | 0 | 8 | 3.8 |

-continued

| Rank | Number | Strength | Year | 1st US Class | Patent Title | Assignee | Cites | NPR | TCT |
|---|---|---|---|---|---|---|---|---|---|
| 64 | 05833766 | 0.50 | 1998 | 134/022.120 | Method and conditioning system for regenerating replacement filters | ** UNASSIGNED ** | 1 | 0 | 5.0 |
| 65 | 05830371 | 0.50 | 1998 | 210/787.000 | Reusable fluid filter and adapter | ** UNASSIGNED ** | 2 | 0 | 25.5 |
| 66 | 05820356 | 0.50 | 1998 | 417/313.000 | Power steering pump apparatus | FORD GLOBAL TECHNOLOGIES INC | 3 | 0 | 12.5 |
| 67 | 05757836 | 0.50 | 1998 | 372/050.000 | Vertical cavity surface emitting laser with laterally integrated photodetector | MOTOROLA INC. | 7 | 1 | 2.7 |
| 68 | 05714063 | 0.50 | 1998 | 210/222.000 | Apparatus for the removal of ferrous particles from liquids | ** UNASSIGNED ** | 4 | 0 | 16.0 |
| 69 | 05702598 | 0.50 | 1997 | 210/223.000 | Magnetic filter | ** UNASSIGNED ** | 2 | 0 | 4.0 |
| 70 | 05675200 | 0.50 | 1997 | 310/090.000 | Dynamic pressure air bearing type electric motor with air circulating arrangement | TOSHIBA KK | 3 | 0 | 7.0 |
| 71 | 05661740 | 0.50 | 1997 | 372/045.000 | TEM mode quantum wire or well structure | USA ARMY SECRETARY | 0 | 0 | 6.5 |
| 72 | 05634755 | 0.50 | 1997 | 411/383.000 | Magnetic drain bolt | ILLINOIS TOOL WORKS, INC. | 2 | 0 | 26.5 |
| 73 | 05569373 | 0.50 | 1996 | 210/090.000 | Reusable fluid filter and adapter | ** UNASSIGNED ** | 5 | 3 | 22.5 |
| 74 | 05564526 | 0.50 | 1996 | 184/006.250 | Magnetic drain plug | ** UNASSIGNED ** | 0 | 0 | 2.5 |
| 75 | 05548893 | 0.50 | 1996 | 029/888.011 | Spin-on oil filter replacement element | ** UNASSIGNED ** | 14 | 0 | 4.5 |
| 76 | 05510024 | 0.50 | 1996 | 210/186.000 | Filter cartridge magnetic attachment | ** UNASSIGNED ** | 7 | 0 | 5.0 |
| 77 | 05469458 | 0.50 | 1995 | 372/045.000 | Surface-emitting semiconductor device | NEC CORP. | 2 | 2 | 2.5 |
| 78 | 05465078 | 0.50 | 1995 | 335/305.000 | Magnetic drain bolt | ILLINOIS TOOL WORKS, INC. | 10 | 0 | 14.0 |
| 79 | 05420557 | 0.50 | 1995 | 335/305.000 | Magnetic drain plug | ** UNASSIGNED ** | 2 | 0 | 36.8 |
| 80 | 05418914 | 0.50 | 1995 | 710/113.000 | Retry scheme for controlling transactions between two busses | NCR CORP. | 22 | 0 | 6.0 |
| 81 | 05336396 | 0.50 | 1994 | 210/090.000 | Waste oil management system | ** UNASSIGNED ** | 5 | 0 | 12.2 |
| 82 | 05226053 | 0.50 | 1993 | 372/045.000 | Light emitting diode | LUCENT REASSIGNED FROM AT&T | 20 | 6 | 2.7 |
| 83 | 05182015 | 0.50 | 1993 | 210/094.000 | Plastic oil filter assembly | ALBEREE LTD., INC. | 16 | 0 | 7.5 |
| 84 | 05174892 | 0.50 | 1992 | 210/131.000 | Permanent fuel filter | DACO MFG. CORP. | 8 | 0 | 9.5 |
| 85 | 05115441 | 0.50 | 1992 | 372/045.000 | Vertical cavity surface emitting lasers with transparent electrodes | LUCENT REASSIGNED FROM AT&T | 30 | 6 | 2.0 |
| 86 | 05019251 | 0.50 | 1991 | 210/133.000 | Filter apparatus with a spring loaded safety valve plate | ** UNASSIGNED ** | 1 | 0 | 11.5 |
| 87 | 05009779 | 0.50 | 1991 | 210/223.000 | Magnetic element with magnesium coil for filter | ** UNASSIGNED ** | 5 | 0 | 30.3 |
| 88 | 04950317 | 0.50 | 1990 | 055/337.000 | AIR FILTER ASSEMBLY AND METHOD OF PUTTING FILTER ELEMENT IN SAME | DONALDSON CO., INC. | 17 | 0 | 10.6 |
| 89 | 04949351 | 0.50 | 1990 | 372/045.000 | SURFACE-EMITTING SEMICONDUCTOR LASER AND MANUFACTURING METHOD OF SAME | OMRON TATEISI ELECTRONICS CO. | 31 | 1 | ** |
| 90 | 04949350 | 0.50 | 1990 | 372/045.000 | SURFACE EMITTING SEMICONDUCTOR LASER | BELL COMMUNICATIONS RESEARCH, INC. | 63 | 13 | ** |
| 91 | 04883591 | 0.50 | 1989 | 210/223.000 | MULTI-PASS FLUID TREATING DEVICE | ** UNASSIGNED ** | 3 | 0 | 8.3 |
| 92 | 04783266 | 0.50 | 1988 | 210/695.000 | Filter for removing particles from a fluid, and method therefore | ** UNASSIGNED ** | 6 | 0 | 10.5 |
| 93 | 04778584 | 0.50 | 1988 | 204/272.000 | Liquid filter device | LIQUID CONCERNED LTD. | 1 | 1 | 21.5 |
| 94 | 04731186 | 0.50 | 1988 | 210/695.000 | Magnetic fluid treating method and device | ** UNASSIGNED ** | 9 | 0 | 21.5 |
| 95 | 04705626 | 0.50 | 1987 | 210/130.000 | Magnetic oil filter module | ** UNASSIGNED ** | 9 | 0 | 20.3 |
| 96 | 04689144 | 0.50 | 1987 | 210/130.000 | DISPOSABLE FILTER UNIT FOR AUTOMATIC TRANSMISSION FLUID | AUSTRALIAN PACIFIC MKTG. PTY. LTD. | 8 | 0 | 12.5 |
| 97 | 04657671 | 0.50 | 1987 | 210/086.000 | Liquid filter with chip detecting means | VICKERS, INC. | 5 | 0 | 18.5 |
| 98 | 04629550 | 0.50 | 1986 | 208/134.000 | CATALYTIC REFORMING OF GASOLINE FEEDSTOCKS | VEBA OEL ENTWICKLUNGS GMBH | 3 | 0 | ** |
| 99 | 04561395 | 0.50 | 1985 | 123/196.00A | AUXILIARY OIL FILTRATION SYSTEM | ** UNASSIGNED ** | 7 | 0 | 18.5 |
| 100 | 04415448 | 0.50 | 1983 | 210/333.100 | Flush-back filter | BOLL & KIRCH FILTERBAU GMBH | 5 | 0 | 12.5 |
| 101 | 04389041 | 0.50 | 1983 | 266/194.000 | Pyrometallurgical furnace system with readily removable wall sections | KLOCKNER-HUMBOLDT-DEUTZ AG | 1 | 0 | ** |
| 102 | 04371439 | 0.50 | 1983 | 210/232.000 | Cam actuated filter assembly | FRAM CORPORATION | 13 | 0 | 26.8 |
| 103 | 04350590 | 0.50 | 1982 | 204/661.000 | Filtration system | ** UNASSIGNED ** | 18 | 0 | 11.5 |
| 104 | 04329231 | 0.50 | 1982 | 210/416.400 | Insulating fuel filter cover | MITTHOFF CORPORATION | 4 | 0 | 14.5 |
| 105 | 04265755 | 0.50 | 1981 | 210/222.000 | Magnetic fluid treating unit | ZIMMERMAN; GEORGE M. SR. | 36 | 0 | 11.5 |
| 106 | 04254393 | 0.50 | 1981 | 335/209.000 | Treatment of fuel | ** UNASSIGNED ** | 6 | 0 | 13.5 |
| 107 | 04238326 | 0.50 | 1980 | 210/695.000 | Fluid processor apparatus and method | ** UNASSIGNED ** | 28 | 0 | 10.5 |
| 108 | 04183591 | 0.50 | 1980 | 384/473.000 | Recirculating bearing oil filter assembly | THERMO KING CORP. | 3 | 0 | 18.5 |
| 109 | 04161013 | 0.50 | 1979 | 361/500.000 | ELECTROMECHANOCHEMICAL DEVICE | MIT | 10 | 2 | 11.0 |
| 110 | 04053410 | 0.50 | 1977 | 210/132.000 | FILTER ASSEMBLY WITH MODULATING BYPASS VALVE | CATERPILLAR INC. | 6 | 0 | 25.3 |
| 111 | 04053409 | 0.50 | 1977 | 210/130.000 | REMOVABLE FILTER ASSEMBLY WITH BYPASS VALVE | CATERPILLAR INC. | 13 | 0 | 10.8 |
| 112 | 04052312 | 0.50 | 1977 | 210/223.000 | STRAINER MAGNETS | FLOW EZY FILTERS, INC. | 5 | 0 | 9.5 |
| 113 | 04026805 | 0.50 | 1977 | 210/223.000 | MAGNETIC FILTER | MAPCO, INC. | 17 | 0 | 18.5 |

-continued

| Rank | Number | Strength | Year | 1st US Class | Patent Title | Assignee | Cites | NPR | TCT |
|---|---|---|---|---|---|---|---|---|---|
| 114 | 03890232 | 0.50 | 1975 | 210/223.000 | FLUID FILTER | KUSS (R.L.) & CO. INC. | 17 | 0 | 9.5 |
| 115 | 03887469 | 0.50 | 1975 | 210/223.000 | LUBRICATING OIL FILTERING DEVICE | ** UNASSIGNED ** | 4 | 0 | 8.3 |
| 116 | 03840045 | 0.50 | 1974 | 137/495.000 | ELECTRICALLY OPERATED VALVES OR DISTRIBUTORS FOR CONTROLLING FLUID UNDER PRESSURE | AUTOMOBILES CITROEN | 8 | 0 | 5.8 |
| 117 | 03827020 | 0.50 | 1974 | 335/285.000 | UNIVERSAL HOLDING DEVICES | ** UNASSIGNED ** | 16 | 0 | 6.5 |
| 118 | 03788473 | 0.50 | 1974 | 210/112.000 | PARTICLE SEPARATOR | KING; ARTHUR S. | 7 | 0 | 17.5 |
| 119 | 03762135 | 0.50 | 1973 | 096/001.000 | SEPARATING DEVICE FOR FINE PARTICLES, SUCH AS CARBONS AND THE LIKE | TOKYO ROKI KABUSHIKI KAISHA | 13 | 1 | 10.5 |
| 120 | 03753183 | 0.50 | 1973 | 335/284.000 | METHOD OF FORMING A MAGNETIZED HELICAL COIL | VICKERS, INC. | 6 | 0 | 9.8 |

| rank | assignee | name | # of patents | % total patents | average strength |
|---|---|---|---|---|---|
| 1 | 658160 | ** UNASSIGNED ** | 45.00 | 37.50 | 1.21 |
| 2 | DONALDSN | DONALDSON CO. INC. | 11.00 | 9.17 | 0.68 |
| 3 | MOTOROLA | MOTOROLA INC | 4.00 | 3.33 | 0.50 |
| 4 | SEAGATE | SEAGATE TECHNOLOGY | 4.00 | 3.33 | 0.50 |
| 5 | LUCENT | LUCENT TECHNOLOGIES | 3.00 | 2.50 | 0.67 |
| 6 | ILLTOOL | ILLINOIS TOOL WORKS INC | 3.00 | 2.50 | 0.50 |
| 7 | 999 | INDIVIDUAL PATENTER | 2.75 | 2.29 | 0.91 |
| 8 | 642652 | WHITE LIGHTNING PREVENTATIVE MAINTENANCE INC | 2.00 | 1.67 | 0.75 |
| 9 | 67179 | BIOCRYSTAL LTD | 2.00 | 1.67 | 0.50 |
| 10 | EATON | EATON CORP | 2.00 | 1.67 | 0.50 |
| 11 | CATERPIL | CATERPILLAR INC | 2.00 | 1.67 | 0.50 |
| 12 | 436277 | OWEN; SHANE MARIE | 1.25 | 1.04 | 3.60 |
| 13 | 210246 | FLUID MAGNETICS INC | 1.00 | 0.83 | 4.00 |
| 14 | DANA | DANA CORPORATION | 1.00 | 0.83 | 2.50 |
| 15 | 200454 | FERROFILTA PTY LTD. | 1.00 | 0.83 | 2.50 |
| 16 | SPX | SPX CORP | 1.00 | 0.83 | 2.00 |
| 17 | 578163 | TECHNOLOGY COMMERCIALIZATION CORP | 1.00 | 0.83 | 1.00 |
| 18 | USA | US ARMY | 1.00 | 0.83 | 0.50 |
| 19 | SCIAPPL | SCIENCE APPLICATIONS INT'L | 1.00 | 0.83 | 0.50 |
| 20 | EMERSON | EMERSON ELECTRIC COMPANY | 1.00 | 0.83 | 0.50 |
| 21 | NEC | NEC CORPORATION | 1.00 | 0.83 | 0.50 |
| 22 | AGILENT | AGILANT TECHNOLOGIES INC. | 1.00 | 0.83 | 0.50 |
| 23 | DAINIPPT | DAI NIPPON PRINTING CO LTD | 1.00 | 0.83 | 0.50 |
| 24 | KLOCKHD | DEUTZ AG | 1.00 | 0.83 | 0.50 |
| 25 | OMRON | OMRON CORPORATION | 1.00 | 0.83 | 0.50 |
| 26 | AISAN | AISAN INDUSTRY COMPANY LIMITED | 1.00 | 0.83 | 0.50 |
| 27 | 363670 | MAPCO, INC. | 1.00 | 0.83 | 0.50 |
| 28 | HONEYWEL | HONEYWELL INC | 1.00 | 0.83 | 0.50 |
| 29 | 324261 | KING; ARTHUR S. | 1.00 | 0.83 | 0.50 |
| 30 | 46861 | AUSTRALIAN PACIFIC MKTG. PTY. LTD. | 1.00 | 0.83 | 0.50 |
| 31 | FORD | FORD MOTOR COMPANY | 1.00 | 0.83 | 0.50 |
| 32 | 592870 | TOKYO ROKI KABUSHIKI KAISHA | 1.00 | 0.83 | 0.50 |
| 33 | 209830 | FLOW EZY FILTERS, INC. | 1.00 | 0.83 | 0.50 |
| 34 | CANON | CANON INC | 1.00 | 0.83 | 0.50 |
| 35 | 138285 | DACO MFG. CORP. | 1.00 | 0.83 | 0.50 |
| 36 | BPAMOCO | BP P.L.C. | 1.00 | 0.83 | 0.50 |
| 37 | 72881 | BOLL & KIRCH FILTERBAU GMBH | 1.00 | 0.83 | 0.50 |
| 38 | PEUGEOT | PEUGEOT S.A. | 1.00 | 0.83 | 0.50 |
| 39 | 656817 | ZIMMERMAN; GEORGE M. SR. | 1.00 | 0.83 | 0.50 |
| 40 | 17296 | ALBEREE LTD., INC. | 1.00 | 0.83 | 0.50 |
| 41 | 327160 | KNECHT FELTERWERKE GESELLSCHAFT MIT BESCHRAENK | 1.00 | 0.83 | 0.50 |
| 42 | MANNHUMM | MANN & HUMMEL | 1.00 | 0.83 | 0.50 |
| 43 | 392291 | MITTHOFF CORPORATION | 1.00 | 0.83 | 0.50 |
| 44 | XEROX | XEROX CORPORATION | 1.00 | 0.83 | 0.50 |
| 45 | NCR | NCR CORPORATION | 1.00 | 0.83 | 0.50 |
| 46 | MIT | MIT/MASS INST OF TECHNOLOGY | 1.00 | 0.83 | 0.50 |
| 47 | INGERAND | INGERSOLL-RAND COMPANY | 1.00 | 0.83 | 0.50 |
| 48 | 489260 | KUSS (R.L.) & CO. INC. | 1.00 | 0.83 | 0.50 |
| 49 | TOSHIBA | TOSHIBA CORPORATION | 1.00 | 0.83 | 0.50 |
| 50 | MITSELEC | MITSUBISHI ELECTRIC CORP | 0.33 | 0.28 | 1.50 |
| 51 | 656302 | ZEOTEC LRC CORP. | 0.33 | 0.28 | 1.50 |
| 52 | 350232 | LIQUID CONCERNED LTD. | 0.33 | 0.28 | 1.50 |
| | | All Assignees Combined | 120.00 | 100.00 | 0.92 |

| rank | class | class name | # of patents | % total patents | average strength |
|---|---|---|---|---|---|
| 1 | 210 | LIQUID PURIF. OR SEPARATION | 69.00 | 57.50 | 1.18 |
| 2 | 372 | COHERENT LIGHT GENERATORS | 12.00 | 10.00 | 0.54 |
| 3 | 335 | ELECTRICITY: MAGNET. OPERATED SWIT | 7.00 | 5.83 | 0.57 |
| 4 | 360 | DYNAMIC MAGNETIC INFORMATION STORAG | 4.00 | 3.33 | 0.50 |
| 5 | 204 | CHEMISTRY: ELECTRICAL & WAVE ENERG | 2.00 | 1.67 | 0.50 |
| 6 | 137 | FLUID HANDLING | 2.00 | 1.67 | 0.50 |
| 7 | 029 | METAL WORKING | 1.00 | 0.83 | 0.50 |
| 8 | 184 | LUBRICATION | 1.00 | 0.83 | 0.50 |
| 9 | 710 | ELECTRICAL COMPUTERS & DIGITAL DATA | 1.00 | 0.83 | 0.50 |
| 10 | 310 | ELECTRICAL GENERATOR, MOTOR STRUCTU | 1.00 | 0.83 | 0.50 |
| 11 | 266 | METALLURGICAL APPARATUS | 1.00 | 0.83 | 0.50 |
| 12 | 055 | GAS SEPARATION | 1.00 | 0.83 | 0.50 |
| 13 | 417 | PUMPS | 1.00 | 0.83 | 0.50 |
| 14 | 361 | ELECTRICITY: ELECTRICAL SYSTEMS & | 1.00 | 0.83 | 0.50 |
| 15 | 208 | MINERAL OILS: PROCESSES & PRODUCTS | 1.00 | 0.83 | 0.50 |
| 16 | 073 | MEASURING & TESTING | 1.00 | 0.83 | 0.50 |
| 17 | 369 | DYNAMIC INFORMATION STORAGE OR RETR | 1.00 | 0.83 | 0.50 |
| 18 | 411 | EXPANDED, THREADED, DRIVEN, HEADED, | 1.00 | 0.83 | 0.50 |
| 19 | 384 | BEARINGS | 1.00 | 0.83 | 0.50 |
| 20 | 096 | GAS SEPARATION: APPARATUS | 1.00 | 0.83 | 0.50 |
| 21 | 134 | CLEANING & LIQUID CONTACT WITH SOLI | 1.00 | 0.83 | 0.50 |
| 22 | 123 | INTERNAL-COMBUSTION ENGINES | 1.00 | 0.83 | 0.50 |
|  |  | All Unknown Classes | 8.00 | 6.67 | 0.50 |
|  |  | All Classes Combined | 120.00 | 100.00 | 0.90 |

What is claimed is:

1. A computer-implemented method of identifying potential licensees for a portfolio of source patents, the method comprising:

(a) providing a database that includes:

(i) the portfolio of source patents, (ii) a set of patents that are neighbor patents with respect to the portfolio of source patents, and (iii) a table that defines the neighbor relationships between the portfolio of source patents and the set of neighbor patents, wherein the table further includes a strength value for each of the neighbor relationships that is determined based on a weighting scheme that assigns weights to each referencing path which decrease with the number of generations between source and neighbor patents, the strength value being the sum of the weights;

(b) querying the database with a search term of interest that exists in at least one of the patents in the database; and (c) outputting a result set based on the query that identifies potential licensees for the portfolio of source patents.

2. The method of claim 1 wherein the portfolio of source patents includes at least one patent.

3. The method of claim 1 wherein step (c) further comprises ranking potential licensees based on the strength value.

4. The method of claim 1 wherein the table further includes a licensing advantage based on forward citation links between the portfolio patents and the neighbor patents.

5. The method of claim 1 wherein the search term of interest is a keyword associated with a portfolio patent.

6. The method of claim 1 wherein the search term of interest is an assignee of a neighbor patent.

7. The method of claim 1 wherein the portfolio of source patents are all owned by the same entity.

8. The method of claim 1 wherein the portfolio of source patents is a subset of a larger group of patents owned by a plurality of entities, the method further comprising:

(d) forming the portfolio of source patents by selecting a single entity and creating the subset from only the patents owned by the single entity.

9. The method of claim 1 wherein the set of patents is not a subset of the portfolio of source patents.

10. A computer-implemented method of identifying potential licensees for a portfolio of source patents, the method comprising:

(a) providing a database that includes:

(i) the portfolio of source patents and metadata regarding the source patents, (ii) a set of patents that are neighbor patents with respect to the portfolio of source patents, and (iii) a table that defines the neighbor relationships between the portfolio of source patents and the set of neighbor patents, wherein the table further includes a strength value for each of the neighbor relationships that is determined based on a a weighting scheme that assigns weights to each referencing path which decrease with the number of generations between source and neighbor patents, the strength value being the sum of the weights;

(b) querying the database with a search term of interest that exists in at least one of the patents in the database or in the metadata; and (c) outputting a result set based on the query that identifies potential licensees for the portfolio of source patents.

11. The method of claim 10 wherein the portfolio of source patents includes at least one patent.

12. The method of claim 10 wherein step (c) further comprises ranking potential licensees based on the strength value.

13. The method of claim 10 wherein the table further includes a licensing advantage based on forward citation links between the portfolio patents and the neighbor patents.

14. The method of claim 10 wherein the search term of interest is a keyword associated with a portfolio patent.

15. The method of claim 10 wherein the search term of interest is an assignee of a neighbor patent.

16. The method of claim 10 wherein the portfolio of source patents are all owned by the same entity.

17. The method of claim 10 wherein the portfolio of source patents is a subset of a larger group of patents owned by a plurality of entities, the method further comprising:
(d) forming the portfolio of source patents by selecting a single entity and creating the subset from only the patents owned by the single entity.

18. The method of claim 10 wherein the metadata includes the industry associated with the patent assignee.

19. The method of claim 10 wherein the set of patents is not a subset of the portfolio of source patents.

20. An article of manufacture for identifying potential licensees for a portfolio of source patents, the article of manufacture comprising a computer-readable medium holding computer-executable instructions for performing a method comprising:
(a) providing a database that includes:
(i) the portfolio of source patents,
(ii) a set of patents that are neighbor patents with respect to the portfolio of source patents, and
(iii) a table that defines the neighbor relationships between the portfolio of source patents and the set of neighbor patents, wherein the table further includes a strength value for each of the neighbor relationships that is determined based on a a weighting scheme that assigns weights to each referencing path which decrease with the number of generations between source and neighbor patents, the strength value being the sum of the weights;
(b) querying the database with a search term of interest that exists in at least one of the patents in the database; and
(c) outputting a result set based on the query that identifies potential licensees for the portfolio of source patents.

21. The article of manufacture of claim 20 wherein the portfolio of source patents includes at least one patent.

22. The article of manufacture of claim 20 wherein step (c) further comprises ranking potential licensees based on the strength value.

23. The article of manufacture of claim 20 wherein the table further includes a licensing advantage based on forward citation links between the portfolio patents and the neighbor patents.

24. The article of manufacture of claim 20 wherein the search term of interest is a keyword associated with a portfolio patent.

25. The article of manufacture of claim 20 wherein the search term of interest is an assignee of a neighbor patent.

26. The article of manufacture of claim 20 wherein the portfolio of source patents are all owned by the same entity.

27. The article of manufacture of claim 20 wherein the portfolio of source patents is a subset of a larger group of patents owned by a plurality of entities, and the computer-executable instructions perform a method further comprising:
(d) forming the portfolio of source patents by selecting a single entity and creating the subset from only the patents owned by the single entity.

28. The article of manufacture of claim 20 wherein the set of patents is not a subset of the portfolio of source patents.

29. An article of manufacture for identifying potential licensees for a portfolio of source patents, the article of manufacture comprising a computer-readable medium holding computer-executable instructions for performing a method comprising:
(a) providing a database that includes:
(i) the portfolio of source patents and metadata regarding the source patents,
(ii) a set of patents that are neighbor patents with respect to the portfolio of source patents, and
(iii) a table that defines the neighbor relationships between the portfolio of source patents and the set of neighbor patents, wherein the table further includes a strength value for each of the neighbor relationships that is determined based on a weighting scheme that assigns weights to each referencing path which decrease with the number of generations between source and neighbor patents, the strength value being the sum of the weights;
(b) querying the database with a search term of interest that exists in at least one of the patents in the database or in the metadata; and
(c) outputting a result set based on the query that identifies potential licensees for the portfolio of source patents.

30. The article of manufacture of claim 29 wherein the portfolio of source patents includes at least one patent.

31. The article of manufacture of claim 29 wherein step (c) further comprises ranking potential licensees based on the strength value.

32. The article of manufacture of claim 29 wherein the table further includes a licensing advantage based on forward citation links between the portfolio patents and the neighbor patents.

33. The article of manufacture of claim 29 wherein the search term of interest is a keyword associated with a portfolio patent.

34. The article of manufacture of claim 29 wherein the search term of interest is an assignee of a neighbor patent.

35. The article of manufacture of claim 29 wherein the portfolio of source patents are all owned by the same entity.

36. The article of manufacture of claim 29 wherein the portfolio of source patents is a subset of a larger group of patents owned by a plurality of entities, and the computer-executable instructions perform a method further comprising:
(d) forming the portfolio of source patents by selecting a single entity and creating the subset from only the patents owned by the single entity.

37. The article of manufacture of claim 29 wherein the metadata includes the industry associated with the patent assignee.

38. The article of manufacture of claim 29 wherein the set of patents is not a subset of the portfolio of source patents.

* * * * *